(12) United States Patent
Hettich

(10) Patent No.: US 9,151,314 B2
(45) Date of Patent: Oct. 6, 2015

(54) PRODUCTION OF A PLANNED DISTRIBUTION OF INTERNAL STRESS IN COMPONENTS BY THE INSERTION OF SCREWS OR THREADED RODS HAVING A THREAD PITCH THAT IS VARIABLE IN THE LONGITUDINAL DIRECTION

(75) Inventor: Ulrich Hettich, Schramberg (DE)

(73) Assignee: LUDWIG HETTICH & CO., Schramberg-Sulgen (DE)

( * ) Notice: Subject to any disclaimer, the term of this patent is extended or adjusted under 35 U.S.C. 154(b) by 1183 days.

(21) Appl. No.: 12/670,857

(22) PCT Filed: Jul. 11, 2008

(86) PCT No.: PCT/EP2008/005687
§ 371 (c)(1),
(2), (4) Date: May 5, 2010

(87) PCT Pub. No.: WO2009/015754
PCT Pub. Date: Feb. 5, 2009

(65) Prior Publication Data
US 2010/0281677 A1 Nov. 11, 2010

(30) Foreign Application Priority Data

Jul. 27, 2007 (DE) .......................... 10 2007 035 183

(51) Int. Cl.
*F16B 39/30* (2006.01)
*F16B 33/02* (2006.01)
*F16B 25/00* (2006.01)

(52) U.S. Cl.
CPC ............. *F16B 33/02* (2013.01); *F16B 25/0073* (2013.01); *F16B 39/30* (2013.01); *Y10T 29/49963* (2015.01)

(58) Field of Classification Search
USPC .......................................... 411/307, 411, 413
See application file for complete search history.

(56) References Cited

U.S. PATENT DOCUMENTS

| | | | | | |
|---|---|---|---|---|---|
| 1,210,509 | A | * | 1/1917 | Marye | .............................. 470/19 |
| 3,256,661 | A | * | 6/1966 | Fischer | ............................ 52/373 |
| 3,405,751 | A | * | 10/1968 | Parr | ................................ 411/307 |
| 3,682,507 | A | * | 8/1972 | Waud | .............................. 411/413 |
| 3,799,229 | A | * | 3/1974 | Johnson | ......................... 411/307 |
| 4,842,464 | A | | 6/1989 | Green | |
| 4,956,888 | A | | 9/1990 | Green | |
| 5,259,398 | A | * | 11/1993 | Vrespa | ........................... 128/898 |

(Continued)

FOREIGN PATENT DOCUMENTS

DE 10 2004 029 305 A1 2/2006
EP 1 146 237 A1 10/2001

OTHER PUBLICATIONS

Forschungsbericht "Moglichkeiten der Erhohung der Tragfahigkeit von Brettschichttragern durch gezieltes Aufbringen und Ausnutzen von Eigenspannungszustanden", IRB Verlag; 1993; T2583/1; pp. 1-43.

(Continued)

*Primary Examiner* — Felmming Saether
(74) *Attorney, Agent, or Firm* — Foley & Lardner LLP

(57) ABSTRACT

Method for reinforcing a component and/or for introducing force into a component using a screw or a threaded rod, wherein the screw or threaded rod has a thread with a variable thread lead, which thread creates an internal stress distribution, which is suitable to reduce at least one maximum in the bond stress occurring under loading of the component.

9 Claims, 37 Drawing Sheets

(56) References Cited

U.S. PATENT DOCUMENTS

| | | | | |
|---|---|---|---|---|
| 6,030,162 | A | * | 2/2000 | Huebner .................... 411/413 |
| 6,261,292 | B1 | * | 7/2001 | Diebold et al. ............. 606/316 |
| 6,398,786 | B1 | * | 6/2002 | Sesic ......................... 606/308 |
| 6,572,315 | B1 | * | 6/2003 | Reed ........................ 411/307 |
| 7,582,107 | B2 | * | 9/2009 | Trail et al. ................. 606/304 |
| 2005/0207868 | A1 | | 9/2005 | Uno et al. |
| 2008/0118332 | A1 | * | 5/2008 | Lamb ........................ 411/411 |

OTHER PUBLICATIONS

Forschungsbericht "Moglichkeiten der Erhohung der Tragfahigkeit von Brettschichttragern durch gezieltes Aufbringen und Ausnutzen von Eigenspannungszustanden", IRB Verlag; 1993; T2583/2; pp. 1-31.

International Search Report corresponding to PCT/EP2008/005687, dated Nov. 18, 2008, 3 pages.

\* cited by examiner

100

US 9,151,314 B2

PRODUCTION OF A PLANNED DISTRIBUTION OF INTERNAL STRESS IN COMPONENTS BY THE INSERTION OF SCREWS OR THREADED RODS HAVING A THREAD PITCH THAT IS VARIABLE IN THE LONGITUDINAL DIRECTION

CROSS-REFERENCE TO RELATED APPLICATIONS

This application is a National Stage application of PCT/EP2008/005687, filed Jul. 11, 2008, which claims the benefit and priority of German Patent Application 10 2007 035 183.8 filed Jul. 27, 2007. The foregoing applications are incorporated by reference herein in their entirety.

The present invention relates to a method for reinforcing a component and/or for introducing force into a component using a screw or a threaded rod and a method for fixing a first part to a second part with the aid of a screw or a threaded rod. Further, it relates to a use of a screw or a threaded rod, a method for the designing of a screw or threaded rod as well as an associated computer program. Finally, the present invention relates to a screw or threaded rod.

BACKGROUND

In the prior art, screws and threaded rods are used, among other things, in order to connect components, to introduce or divert loads in components, or in order to reinforce components. In all of these applications, the course of the bond stress in the connection has a decisive influence on the size of the load level that can be achieved by means of this connection. The course of the bond stress is in turn dependent on the paired materials, the axial rigidities of component and screw or threaded rod and the embedded length. The maximum bond stress arising, which arises in the region of the greatest extension difference between the component and screw or threaded rod is generally decisive for the failure load.

BRIEF SUMMARY

The present invention is based on the object of improving connections of this type between a component and a screw or threaded rod, so that a reliable, robust bond can be achieved in the case of higher loads than is possible in the case of the prior art.

This object is achieved by means of a method according to Claim 1 or 10, a screw or threaded rod according to Claim 16 and the use of a screw or threaded rod of this type according to Claim 13. Further developments are advantageously specified in the dependent claims.

According to one aspect of the invention, a method for reinforcing a component and/or for introducing force into a component using a screw or a threaded rod is provided, wherein the screw or threaded rod has a thread with a variable threadlead, so that an internal stress distribution is created in the component, which is suitable to reduce at least one maximum in the bond stress between the screw or threaded rod and the component, which occurs under loading of the component. Herein, the screw or threaded rod may be self cutting.

Thanks to the variable thread lead, a prestress of both the component and the screw or threaded rod results when screwing the screw into the component, which prestress is designated as "internal stress" in the present document. The internal stress is therefore a stress which results solely by means of the variable thread lead, without any outside load onto the component. The internal stress in particular creates a bond stress $\tau_{ES}$ between the screw or threaded rod and the (not yet loaded) component.

As this bond stress $\tau_{ES}$ of the internal stress is in turn solely caused by the variable thread lead, it is to a certain degree freely predeterminable by means of suitable designing of the thread. According to the present invention, the thread is then designed such that the bond stress $\tau_{ES}$ of the internal stress has a course or behaviour such that the bond stress, at least in sections, is opposite to the "normal" bond stress $\tau$, which results due to the loading of the component, at least in sections. As a result, the maxima in the effective or combined bond stress which results from a superposition of $\tau$ and $\tau_{ES}$, are reduced considerably, as compared with the maxima of $\tau$ alone, so that failure of the bond only occurs in the case of much higher loads.

As mentioned above, the specific shape of the thread must be adjusted to the stress course or curve to be expected in the bond under load. This can be implemented in practice in various ways which differ in their degree of complexity.

First of all, it is possible to design the suitable thread for a specially planned application. If, for example, a wooden hall roof construction is designed, reinforcements in wooden girders, for example glued laminated beams, are taken into account in the static calculations. In an application of the invention, the bond stress occurring under load could then be determined for every reinforcement screw, for example by means of analytical calculations as are explained in more detail below or by means of computer simulations with finite element models (FEMs). Then, for every locally occurring stress distribution, a thread which is nearly optimally adapted thereto can be designed, by means of which thread peaks in the bond stress are reduced and the potential of the invention is optimally utilised. However, to this end, individually designed reinforcement screws need to be produced in small piece numbers, which increases the costs of the reinforcement screws compared with conventional standard reinforcement screws.

In a further way to carry out the invention standardised screws or threaded rods for standard applications are provided. For example, the bond stress courses or curves for connections for load introduction are generally of hyperbolic shape and they are, in principle, similar for all screw connections. Herein, the maximum bond stresses occur at the point of the introduction of load, that is to say at the edge of the component. In the case of the same axial rigidity and short bond lengths, a further maximum of the bond stress in the region of the leading end of the reinforcement screw can arise. As the bond stress courses are similar in different applications, it is possible to design standard thread forms for certain material combinations (for example steel/wood, steel/light metal and steel/plastic), which standard thread forms possibly do not utilise the full potential of the invention in all applications, but generally lead to a combined bond stress in which the maxima thereof are reduced considerably in comparison with a use of a conventional thread with constant thread lead.

An example for an advantageous configuration of a standard thread for the introduction of force provides a bonding thread section that can be screwed into a component in order to form a bond with the component, said bonding thread section having a first end, which is the leading end when screwing in, and a second end, wherein the thread lead has a first local extremum in the half of the bonding thread section adjacent to the second end, as illustrated in FIG. 36. This first local extremum is a maximum if a compressive load is to be introduced into the component and a minimum if a tensile load is to be introduced. Owing to this local extremum in the region of the second end of the bond, that is to say in the region of the edge of the component, the known maximum of the bond stress under load at the second end of the bonding thread section can be reduced, as is explained in more detail below with reference to an exemplary embodiment.

The above mentioned bonding thread section is the part of the thread which is meant for forming the bond and over the length of which the thread form is effective at all. If the length of the bonding thread section is standardised to one, said first local extremum mentioned above is preferably located at a distance of 0.6 to 0.9 and preferably of 0.7 to 0.85 from the first end.

Further, the thread lead can have a second local extremum which is located in the half of the bonding thread section adjacent to the first end and has a curvature which is opposite to that of the first local extremum. If the first local extremum is a maximum, the second local extremum is therefore a minimum and vice versa. Due to this second local extremum, a further maximum in the bond stress occurring under load can be compensated, which maximum is present at the first end of the bonding thread section, that is to say in the region of the leading end of the screw or threaded rod.

The second local extremum is preferably located at a distance of 0.05 to 0.4 and particularly preferably of 0.1 to 0.3 from the first end of the bonding thread section.

According to an advantageous embodiment of the method, in said case of reinforcement, a screw or threaded rod is used for which the thread lead, starting from a value $p_0$ at the first end, falls by a value $\Delta p$ in a section adjacent to the first end, remains below $p_0 - \Delta p$ in a middle section and rises above the value $p_0 - \Delta p$ again at the section adjacent to the second end, as illustrated in FIG. 37. Broadly speaking, this corresponds to a thread behaviour or characteristic in which the thread lead is high at the beginning and at the end of the bonding thread section and is low in a section located therebetween, which means that the thread flanks in this middle section are located closer to one another and that the component is therefore compressed in this middle section. This qualitative illustration is made more precise below on the basis of concrete calculations. Thanks to a thread form of this type, a virtually constant compression can be generated in the interior of the reinforced component, which is advantageous for many applications.

If one in turn assumes that the length of the bonding thread section is standardised to one, the first and/or the second section preferably has a length of between 0.07 and 0.35, particularly preferably between 0.1 and 0.3 and in particular between 0.15 and 0.25.

The lead in the middle section does not have to be constant, but it should vary by less than $\pm 0.5 \Delta p$, preferably by less than $\pm 0.3 \Delta p$ to create the desired effect.

Further, the thread leads at the first and at the second end of the bonding thread section deviate from one another by less than 50%, preferably less than 30% and particularly preferably by less than 10% of the overall variation in the thread lead in the bonding thread section. In preferred embodiments, the thread leads at the first and second end of the bonding thread section are therefore relatively close to one another and in the exemplary embodiments shown below, they are even identical.

A further aspect of the invention relates to a method for fixing a first part to a second part using a screw or threaded rod, in which the screw or threaded rod has a thread lead that varies in the longitudinal direction of the screw or threaded rod, wherein the variation of the thread lead is chosen such that the stress distribution which results in the second part when tightening the screw is more uniform than in the case of using a screw with constant lead and the same fixing pressure. In this embodiment of the invention, the issue is therefore not to reduce bond stresses in the case of external loading, but rather to make the stress distribution, which results in the second part due to the tightening of the screw, more uniform by means of the superposition of a suitable internal stress distribution.

An advantageous application of this method consists for example in the connection of light metal parts, particularly parts which contain aluminium or magnesium. For example, a cylinder head could be screwed to an engine block which consists of light metal using this method. The problem in the case of connections of this type consists in the fact that the light metal begins to creep in the case of thermal loading, as a result of which the connection is weakened. The extent of the creep in turn depends on the size of the stress. If it is therefore possible to form stresses in the second part or bond stresses in a more uniform manner with the method according to the invention than with conventional screws, the creeping effect can also be substantially reduced.

In the case of an application of this type, it would therefore be worth it to design the screws exactly for the planned application, as, on account of the high piece number of engines produced, they would likewise be produced in high piece numbers, which makes the outlay for the determination of the stress distribution and the designing of the screw cost effective.

BRIEF DESCRIPTION OF THE DRAWINGS

Further advantages and features of the present invention result from the following description in which the invention is explained in more detail on the basis of exemplary embodiments with reference to the attached figures. In the figures.

DETAILED DESCRIPTION

Figure 1:
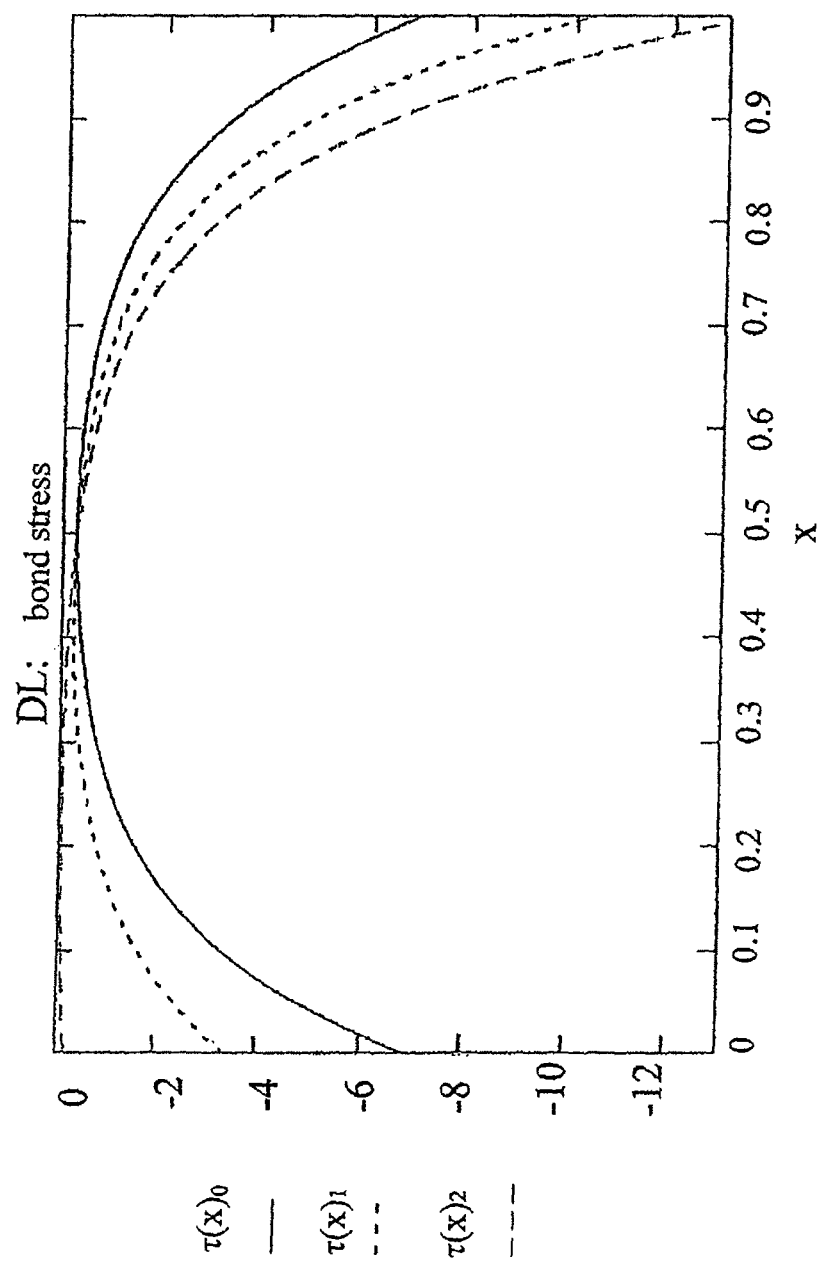
FIGS. 1 and 2 show the course or curve for three typical bond stresses in the case of the introduction of a compressive or tensile load.

In the following, the principles of the invention shall be explained on the basis of two exemplary embodiments. The first exemplary embodiment relates to the introduction of a load into a component by means of a screw or threaded rod. The second exemplary embodiment relates to the reinforcement of a component by means of a screw or threaded rod. For the sake of simplicity, reference is only made to a "screw" in the following, but it shall be understood that everything that is being said likewise applies for a threaded rod.

In both exemplary embodiments, the relevant quantities bond stress, extension and axial stress of the screw; extension and axial stress of the component and slippage between screw and component are determined in a closed form in an analytical calculation, wherein the component in the bond is replaced by a so-called replacement cylinder in the calculation. Further, the designing of a thread with variable thread lead is specified, which is suitable to compensate the bond stress under load arising at least to some extent.

The following derivation and the exemplary embodiments are not only used however for explaining the principles of the invention. Rather, in many cases, even with the analytical closed solution for the stress conditions and the designing of a suitable thread lead variation outlined in the following, screws can be designed in practice, with which the maximum bond stresses occurring under load can be reduced very considerably, as a result of which the failure load is increased. Additionally, even with the following analytical derivation, characteristic thread forms can be determined, which in the case of typical load situations as would occur in the case of load introduction and reinforcement allow to considerably reduce the bond stress occurring.

For more complex cases, in which a closed analytical solution is no longer possible, for example due to geometric or material-dependent nonlinearities, the corresponding results can be derived with numeric methods, for example by means of finite element models (FEMs).

In the following, first the mathematical apparatus for determining the bond stress under load and for designing suitable screws with variable thread lead is introduced. In the following sections 2 and 3, the mathematical apparatus is used in order to design suitable thread forms for realistic example cases of load introduction and reinforcement, respectively.

1. Mathematical Foundations

In the present invention, a screw is provided with a thread having a lead that varies in the longitudinal direction of the screw. The spatial course of the centre of mass of the flank cross section of the thread is parameterised by the following directrix curve:

$$LK(x) = \begin{pmatrix} f(x, \tau_b(x), \varepsilon_t(x)) \\ r(x) * \cos\left(x * \frac{l_b}{p0} * 2\pi\right) \\ r(x) * \sin\left(x * \frac{l_b}{p0} * 2\pi\right) \end{pmatrix} \quad (1)$$

in which the following variables are used:
x: standardised length with $0 \leq x \leq 1$
r(x):: radius of the focus of the flank cross section
$f(x, \tau_b(x), \varepsilon_t(x))$:: x coordinate of the directrix curve
$\tau_b(x)$:: course of the bond stress
$\varepsilon_t(x)$:: course of the component extension In the above illustration, the x coordinate corresponds to the longitudinal direction of the screw. In the case of a conventional screw with constant thread lead, the function f(x) of the directrix curve would be a linear function of x. In the case of the present invention, by contrast, the course of f is chosen in such a manner that by means of a variable thread lead of the screw, an internal stress in the bond between the component and screw is created, which acts against the bond stress arising under load in such a manner that at least the peaks of the bond stress under load are attenuated. The suitable function f is therefore not only a function of the coordinate x, but is rather also dependent on the bond stress $\tau_b(x)$ to be expected under load and the extension $\varepsilon_t(x)$ of the component under load.

Forces between the component and the screw are transferred by means of bond stresses $\tau_b$ which are generally defined as follows:

$$dT = \tau_b \cdot d_s \cdot \pi \cdot dx \quad (2)$$

wherein dT is the infinitesimal change in the axial force which acts on an infinitesimal screw section dx, and $d_s \cdot \pi$ it corresponds to the circumference of the screw. Without the bond stress $\tau_b$, no load could be introduced into the component via the screw and, in the case of a reinforcement, tensile or compressive force within the component can only be transferred onto the reinforcement by means of said bond stress.

In the following calculations, the component is represented by a replacement cylinder with a diameter $d_t$. The prerequisites for the determination of the directrix curve are then:
the knowledge of the loading state of the connection,
the knowledge of the bond principle between the thread and the component, and
the knowledge of the diameter $d_t$ of the representative replacement cylinder.

Herein the bond principle and the diameter $d_t$ of the replacement cylinder can, if necessary, be determined in experiments.

The dimensions and properties of the thread and the component are designated as follows:

TABLE 1

| Geometry | Thread | Component |
|---|---|---|
| Diameter | $d_s$ | $d_t$ |
| Cross-sectional area | $A_s = \frac{\pi}{4} d_s^2$ | $A_t = \frac{\pi}{4} d_t^2 - A_s$ |
| E modulus | $E_s$ | $E_t$ |
| Bond length | $l_b$ | $l_b$ |

Further, the following auxiliary variables are defined:

$$u_s = \frac{\pi * d_s}{E_s * A_s},$$

$$u_t = \frac{\pi * d_t}{E_t * A_t},$$

$$u = u_s + u_t,$$

$$\varphi A = \frac{A_t}{\pi * d_s},$$

$$n = \frac{E_s}{E_t}, \text{ and}$$

$$\rho = \frac{d_s^2}{d_t^2 - d_s^2}$$

The relative displacement between the thread and the component, which is also designated as "slippage" δ, corresponds to the integral over the difference of the extensions $\epsilon_S$ of the screw and $\epsilon_t$ of the component:

$$\delta(x) = \int_0^x (\epsilon_S(t) - \epsilon_t(t)) dt \quad (3)$$

The extension difference $\epsilon_S - \epsilon_t$ represents the first derivative of the slippage δ, and the bond stress $\tau_b$ corresponds to the second derivative of the slippage δ:

$$\frac{d^2}{dx^2} \delta(x) = u * \tau(x) \quad (4)$$

With a linear bond principle:

$$\tau_b(\delta) = \tau_0 + k * \delta, \quad (5)$$

the 2nd order inhomogeneous differential equation of the displaceable bond receives the following form:

$$\frac{d^2}{dx^3} \delta(x) = u * k * \delta + u * \tau_0 \quad (6)$$

If the coordinate x is chosen in such a manner that 0≤x≤1 is true and further, an auxiliary variable λ is defined as:

$$\lambda = l_b * \sqrt{u * k} \quad (7)$$

the following solution results for the slippage δ(x):

$$\delta(x) = c1 * e^{\lambda * x} + c2 * e^{-\lambda * x} - \frac{\tau_0}{k}. \quad (8)$$

The following state variables of the bond can be determined from the solution for the slippage:

Extension of the screw:

$$\epsilon_s(x) = \lambda * \frac{u_s}{u * l_b} * (c1 * (e^{\lambda * x} - 1) - c2 * (e^{-\lambda * x} - 1)) + \epsilon_{s0}$$

Extension of the component:

$$\epsilon_t(x) = \lambda * \frac{-u_t}{u * l_b} * (c1 * (e^{\lambda * x} - 1) - c2 * (e^{-\lambda * x} - 1)) + \epsilon_{t0}$$

Axial stress of the component: $\sigma_t(x) = \epsilon_t(x) * E_t$
Axial stress of the screw: $\sigma_s(x) = \epsilon_s(x) * E_s$
Bond stress:

$$\tau_b(x) = \frac{\lambda^2}{u * l_b^2} * (c1 * e^{\lambda * x} + c2 * e^{-\lambda * x})$$

wherein:

$$\tau_b(x) = \frac{d}{dx} \sigma_t(x) * \frac{\varphi_A}{l_b}$$

The above description of the bond stress $\tau_b$ and the extensions $\epsilon_s$ of the screw and $\epsilon_t$ of the component are generally valid, independently of the specific construction of the thread and for example also apply in cases in which no thread is used at all, and e.g. a metal rod is adhesively bonded or cast into a component instead. Thanks to the use of a screw with a thread having a lead that varies in the longitudinal direction of the screw, an additional prestress can be created in the component and in the screw in addition to the "usual" bond stress $\tau_b$ arising under load, which prestress is designated as "internal stress" or "self-contained stress" herein. The "internal stress" is a prestress which results solely due to the variation in the thread lead of the screw and which is already present when the screw is screwed into the non-loaded component.

The internal stress for its part creates a bond stress $\tau_{ES}$, which in the loading case is superposed with $\tau_b$. In the context of the invention, the thread lead is then varied in such a manner that the bond stress $\tau_{ES}$ of the internal stress acts against the bond stress $\tau_b$ due to loading in such a manner that peaks in the bond stress $\tau_b$ due to loading are attenuated.

An extension $\epsilon_{ES}(x)$, which the component experiences on account of the internal stress corresponds to the internal stress. The relationship between the bond stress of the internal stress $\tau_{ES}$ and the extension $\epsilon_{ES}$ of the component as a consequence of the internal stress is as follows:

$$\tau_{ES}(x) = \frac{-\varphi_A}{l_b} * E_t * \frac{d}{dx} \epsilon_{ES}(x). \quad (9)$$

Further, no virtual work can be carried out by the internal stress, that is to say the following applies:

$$\int_0^x \tau_{ES}(t) dt = 0, \quad (10)$$

which means that the average bond stress of the internal stress $\tau_{mES}=0$, i.e. that the following applies:

$$\Rightarrow \tau_{mES} = \frac{-\varphi A}{l_b} * E_t * (\varepsilon_{ES}(1) - \varepsilon_{ES}(0)) = 0 \quad (11)$$

$$\Rightarrow \varepsilon_{ES}(0) = \varepsilon_{ES}(1)$$

The first step in the derivation of a suitable thread form or directrix curve of the thread therefore consists in predetermining a suitable bond stress $\tau_{ES}$ of the internal stress and, from this, then determining the corresponding extension course or curve $\epsilon_{ES}(x)$ of the component as a consequence of the internal stress. The desired course of the directrix curve can then be determined from the extension course $\epsilon_{ES}(x)$ as follows:

Let p0 be the nominal lead or average lead of the thread, which shall be varied. The actual variable lead p(x) of the thread is then expressed as follows:

$$p(x)=p0-dp(x), \quad (12)$$

wherein the variation of the lead dp at the point x is given by:

$$dp(x) = p0 * \varepsilon_{ES}(x) * \left(1 - \frac{A_t * E_t}{A_s * E_s}\right). \quad (13)$$

Thus, the following directrix curve results for the thread with the desired properties:

$$LK(x) = \begin{pmatrix} p0 * \left[x * \frac{l_b}{p0} - \left(1 - \frac{A_t * E_t}{A_s * E_s}\right)\int_0^z \varepsilon_{ES}(s)ds\right] \\ r(x) * \cos\left(x * \frac{l_b}{p0} * 2\pi\right) \\ r(x) * \sin\left(x * \frac{l_b}{p0} * 2\pi\right) \end{pmatrix} \quad (14)$$

The directrix curve according to the above Equation (14) therefore describes the spatial course of the centre of mass of the flank cross section of the screw if it is not screwed into the component, that is to say if the screw is not itself extended. In other words, the screw with the desired properties can be produced on the basis of the directrix curve defined in Equation (14).

2. Exemplary Embodiment: Load Introduction

Figure 35:
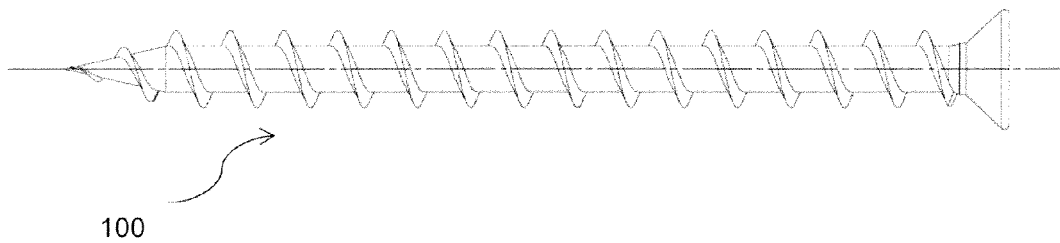
FIG. 35 depicts an embodiment of a screw.
Figure 36:
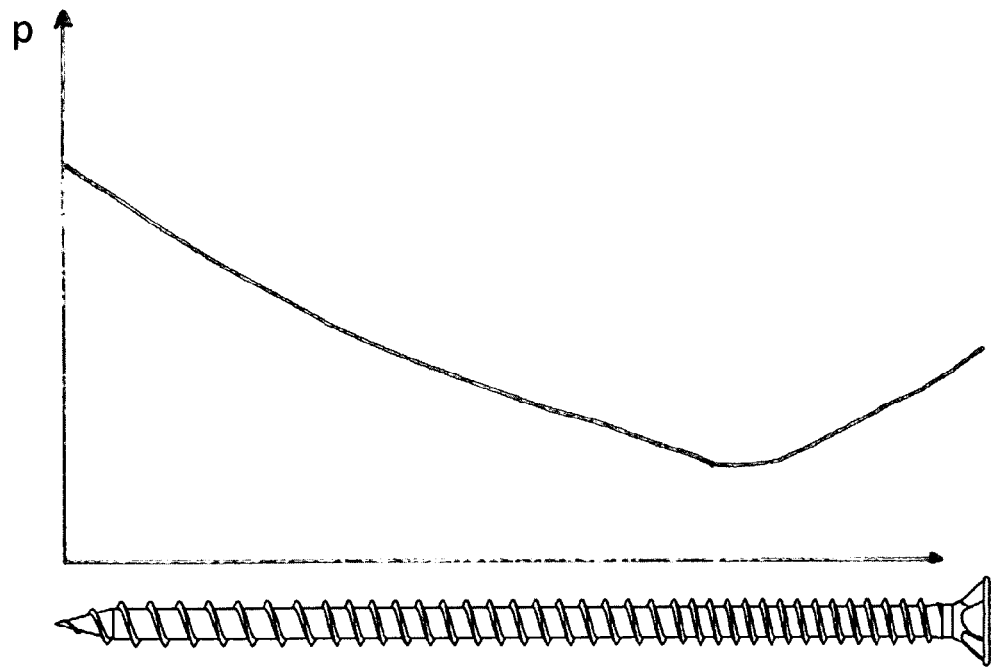
FIG. 36 depicts an embodiment of a screw having a local minimum in a half of the thread adjacent to the second end and spaced from the second end, and a plot showing the variation of the thread lead of the screw.
Figure 37:
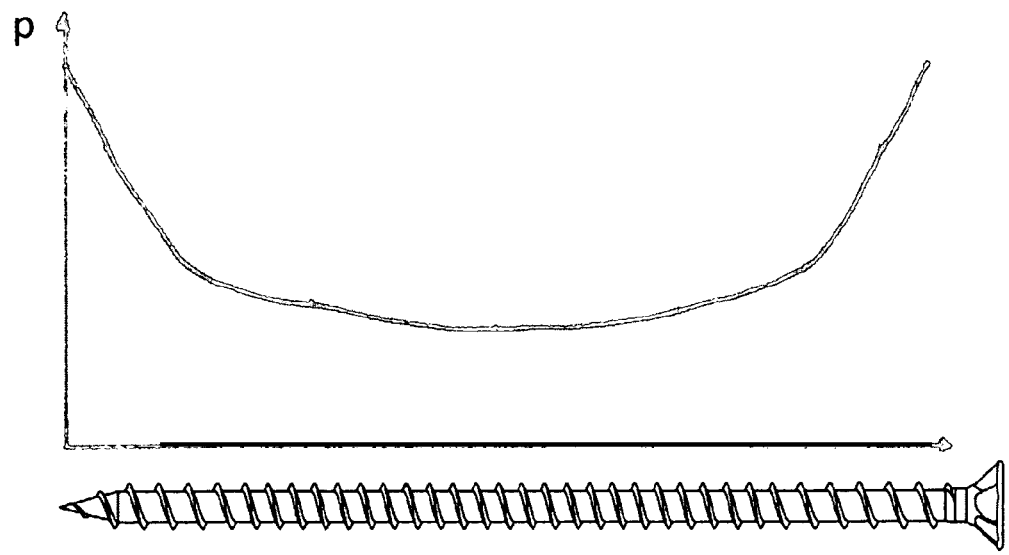
FIG. 37 depicts an embodiment of a screw having a high thread lead at its first and second ends, and a lower thread lead in a middle region therebetween, and a plot showing the variation of the thread lead of the screw.

In the case of the connection between a screw and a component for load introduction, loads should be introduced into the component or diverted out of the component via the screw. These effects largely predetermine the stress state in the bond. The screw can be, for example, a screw such as screw 100 shown in FIG. 35.

Figure 2:
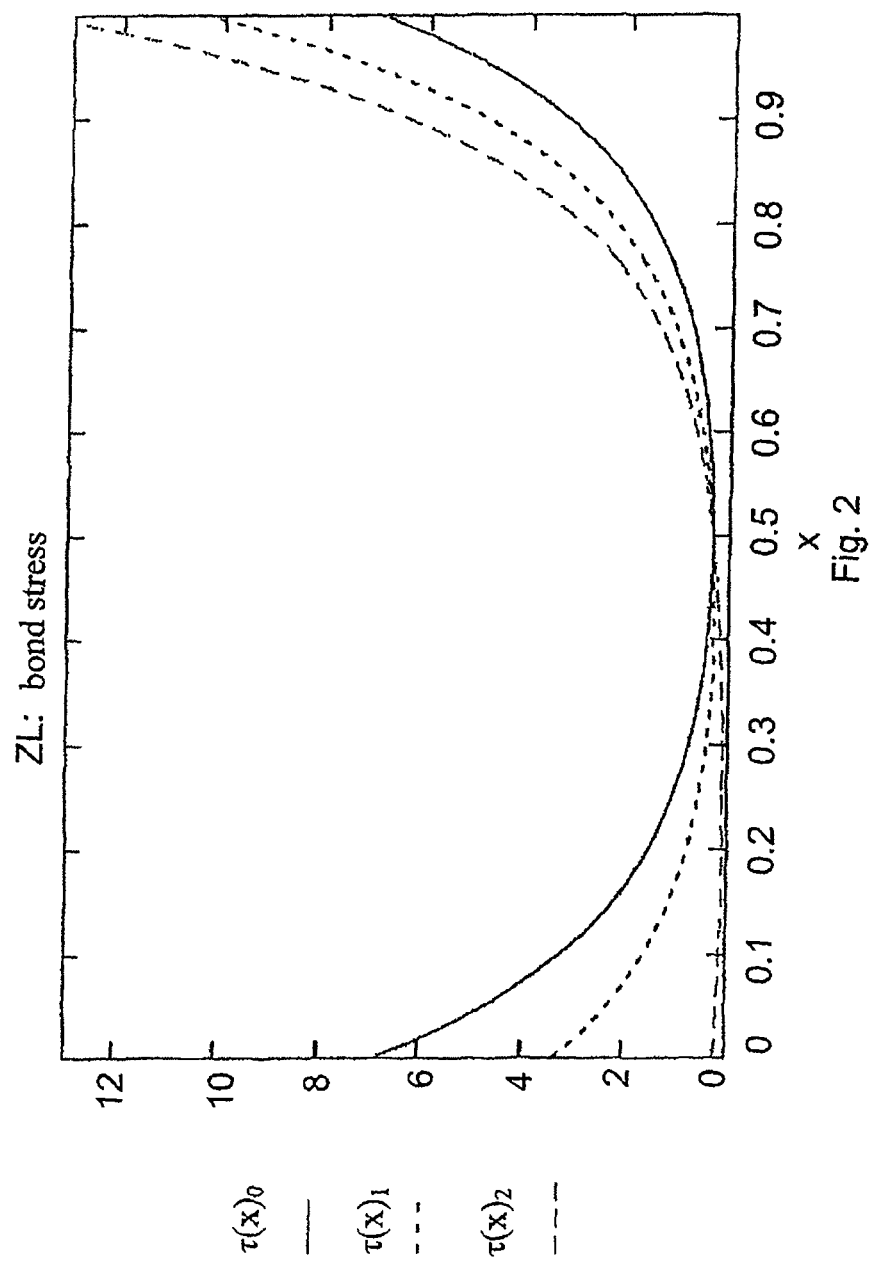

Three typical courses of the bond stress in the case of the introduction of a compressive load into a component are shown in FIG. 1. FIG. 2 shows the corresponding courses of the bond stress for the case that a tensile load is introduced into the component.

The three typical bond stress courses or curves are characterised by the indices 0, 1 and 2. The same indices 0, 1 and 2 are used in the following FIGS. 1 to 28 in order to designate the associated further parameters for the three bond stress courses shown in FIGS. 1 and 2. The situation of the load introduction with a bond stress $\tau(x)_0$, as is shown in FIGS. 1 and 2, is therefore also designated as "Case 0" in the following description. The bond stress "$\tau$" corresponds to the variable "$\tau_b$" from the preceding section. Likewise, the load introductions with bond stresses $\tau(x)_1$ and $\tau(x)_2$, as are shown in FIGS. 1 and 2, are designated as "Case 1" and "Case 2", respectively.

As can be seen from FIGS. 1 and 2, the Case 0 is characterised by a symmetrical course of the bond stress $\tau(x)_0$. A symmetrical bond stress course of this type is typical for situations in which the axial rigidities of the component and the screw are equal or similar and in which the bond length is short. As can be recognised in FIGS. 1 and 2, in Case 0, the maxima of the bond stress $\tau(x)_0$ arise at the beginning and the end of the bond length.

Case 2 describes an asymmetric bond stress course, as typically arises in the case of unequal axial rigidities and short anchoring lengths. The bond stress course $\tau(x)_1$ typical for such cases is characterised by a strong pronounced maximum at the beginning of the bond, that is to say at the exterior of the component when x=1. However, in Case 1, a somewhat less strongly pronounced maximum of the bond stress $\tau(x)_1$ arises at the end of the bond, that is to say when x=0.

The Case 2 is characterised by an asymmetric course of the bond stress $\tau(x)_2$, in the case of which course a maximum of the bond stress $\tau(x)_2$ arises at the beginning of the bond (when x=1) and the bond stress $\tau(x)_2$ decreases continuously up to the end of the bond (x=0). A bond stress course of this type is typical for unequal axial rigidities of the screw and of the component and long bond lengths.

In the following calculation of the extensions and axial stresses in the screw and in the component, the following numerical values were used for the variables defined in the preceding section 1:

$d_s=6$,
$d_t=20$,
$E_s=210.000$,
$E_t=400$, and
$l_b=160$.

Figure 3:
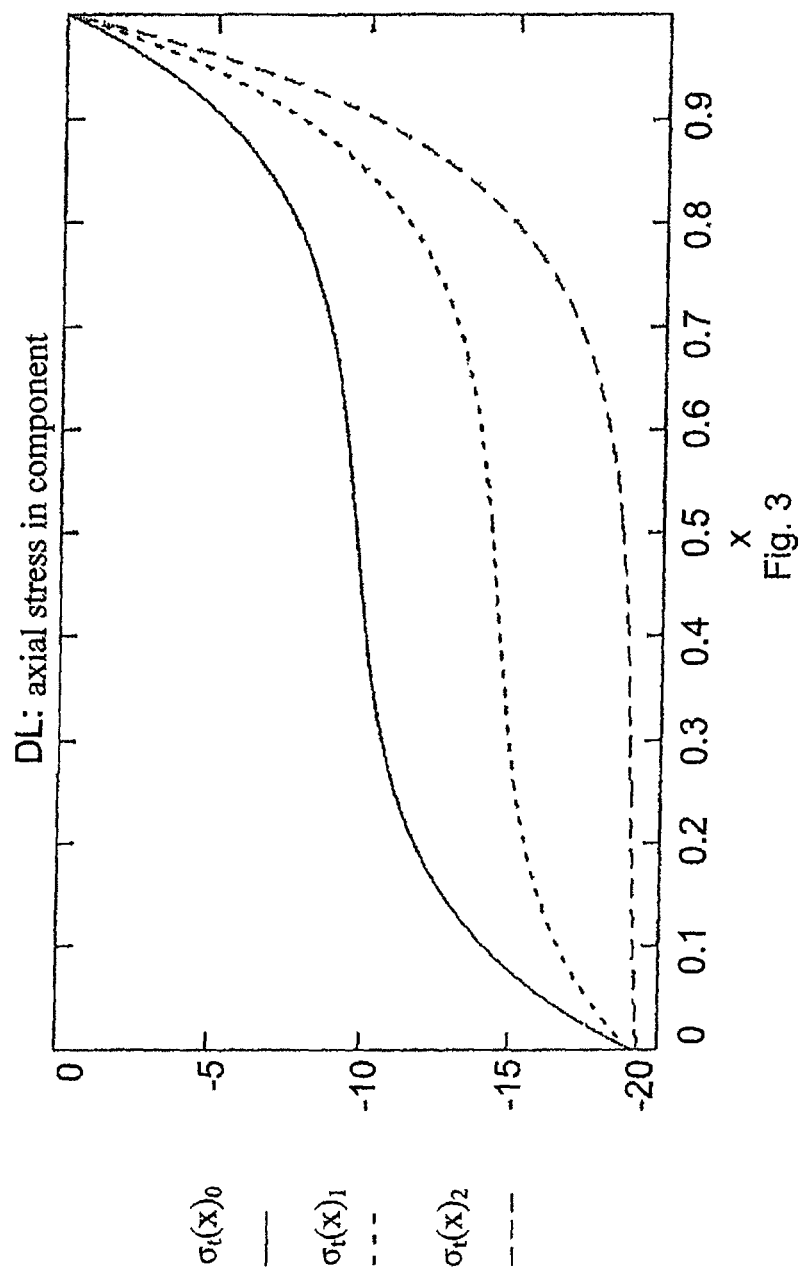
FIGS. 3 and 4 show the course or curve for the axial stresses in the component for the cases of FIGS. 1 and 2, respectively.
Figure 4:
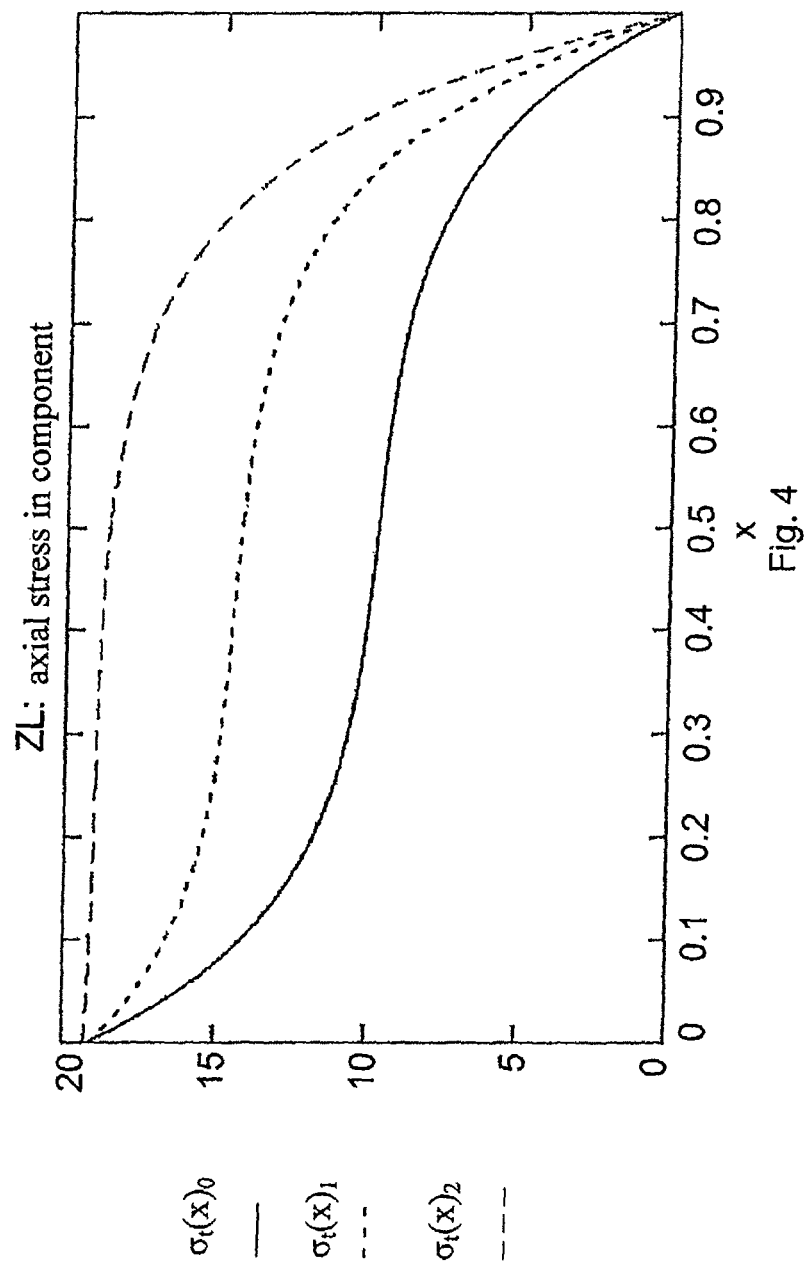

FIG. 3 shows the axial stress $\sigma_t(x)$ in the component for the Cases 0, 1 and 2 in the case of a compressive load and FIG. 4 shows it in the case of a tensile load.

Figure 5:
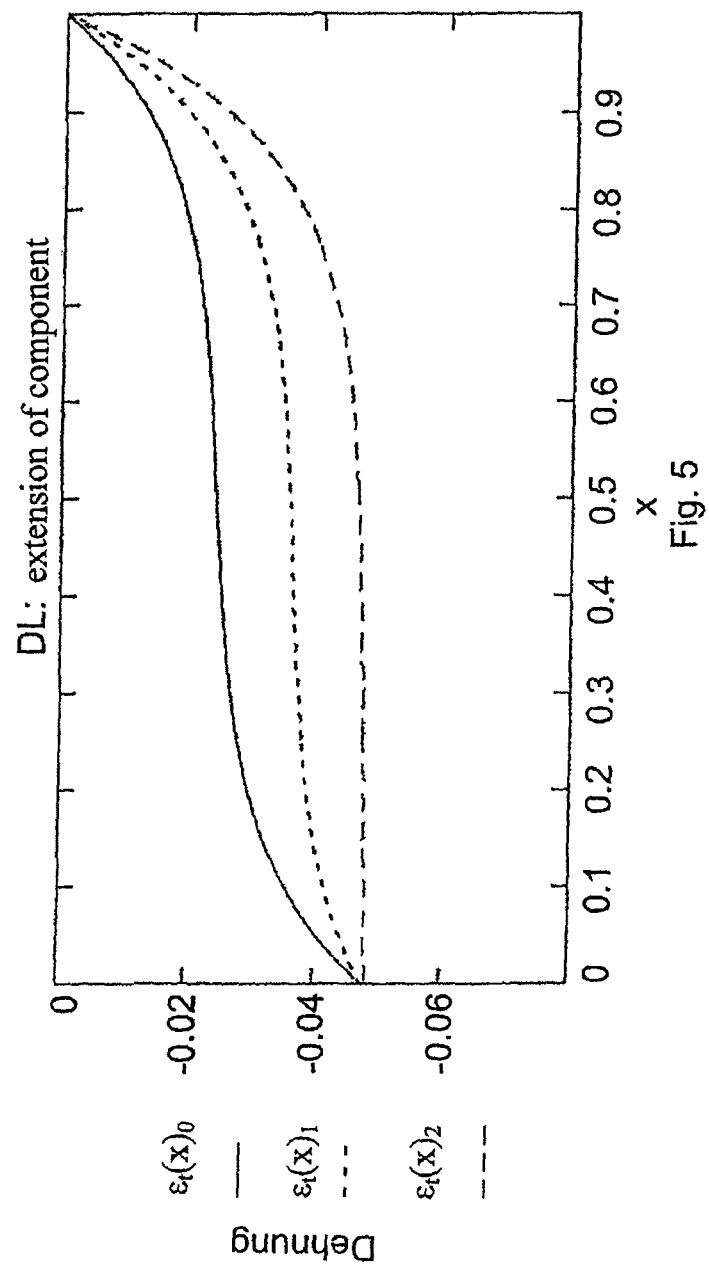
FIGS. 5 and 6 show the extension course or curve in the component for the cases of FIGS. 1 and 2, respectively.
Figure 6:
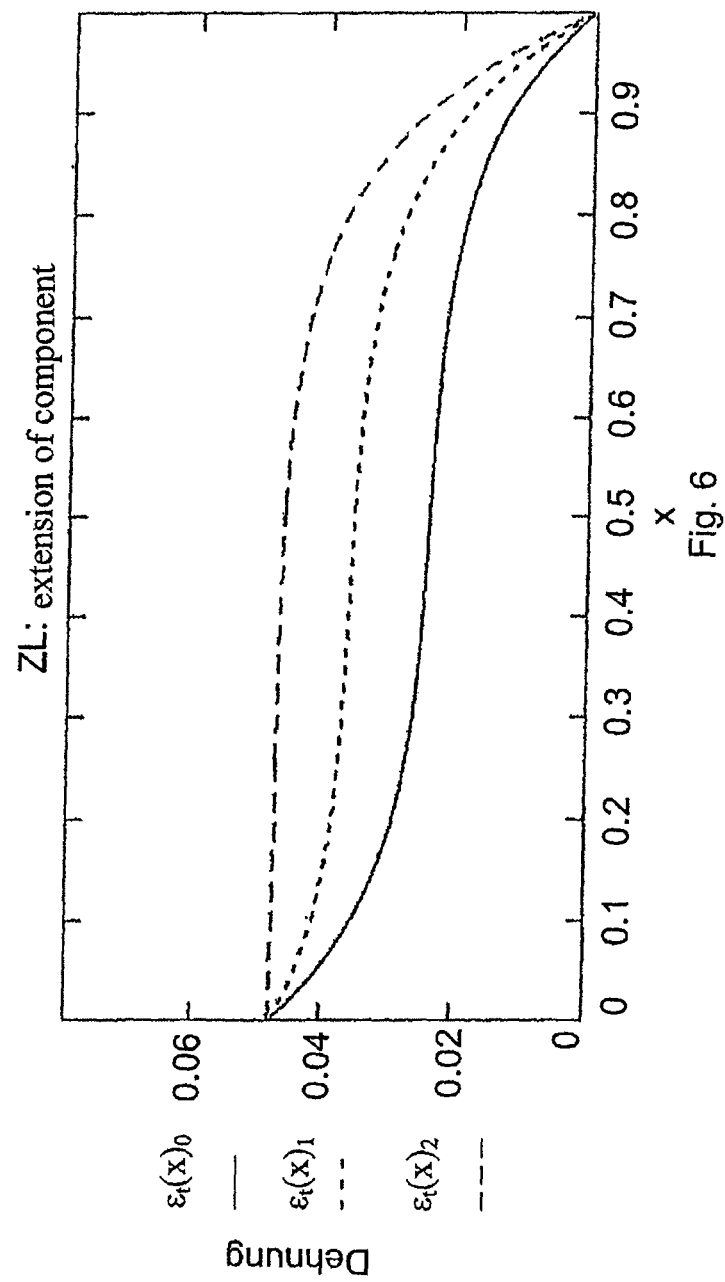

FIG. 5 shows the extension $\epsilon_t(x)$ in the component for the Cases 0, 1 and 2 for the case of a compressive load and FIG. 6 shows it for the case of a tensile load.

It can be seen in FIGS. 3 and 4 that the axial stress $\sigma_t(x)_0$ for the Case 0 increases strongly at the beginning and at the end of the bond length, whilst it rises merely moderately in the middle of the bond. The rapid local rise of the axial stresses at the ends of the bond already points to a source of failure in the case of load introduction. In Case 1 and 2, the strong rise of the axial stress is concentrated by contrast on the beginning of the bond, that is to say on the region of x=0.7 to x=1.

Figure 7:
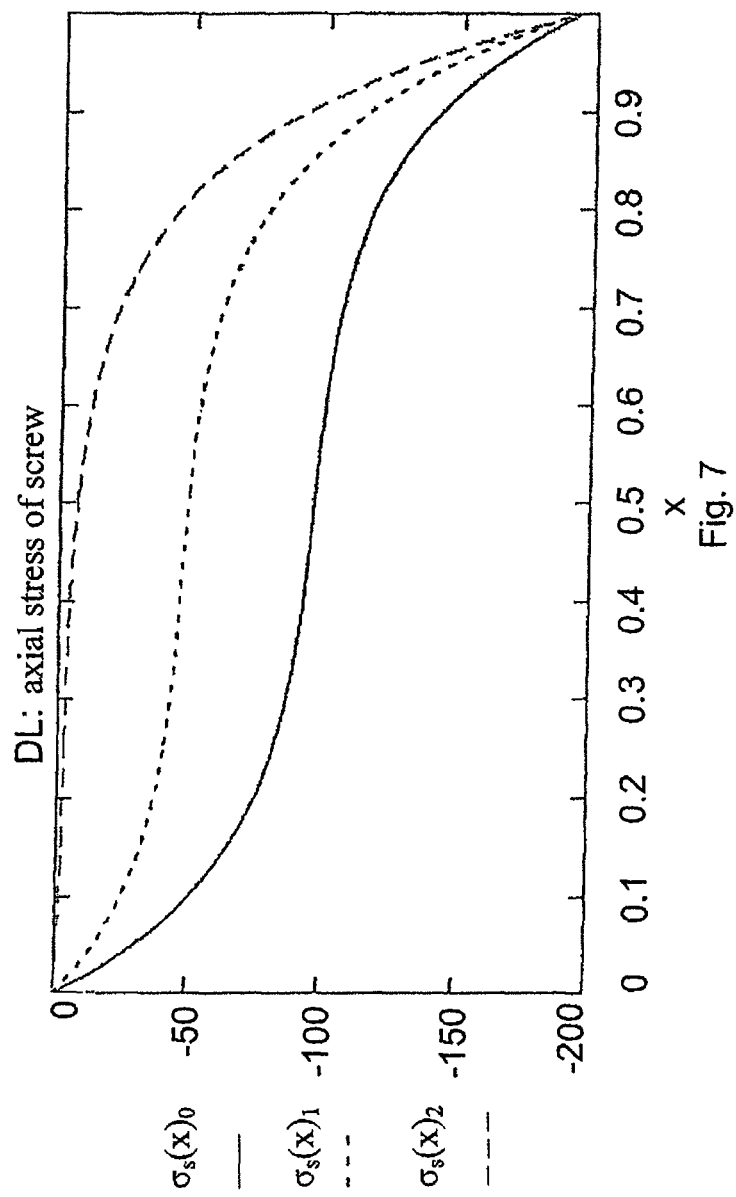
FIGS. 7 and 8 show the course or curve for the axial stress of the screw for the cases of FIG. 1 and FIG. 2, respectively.
Figure 8:
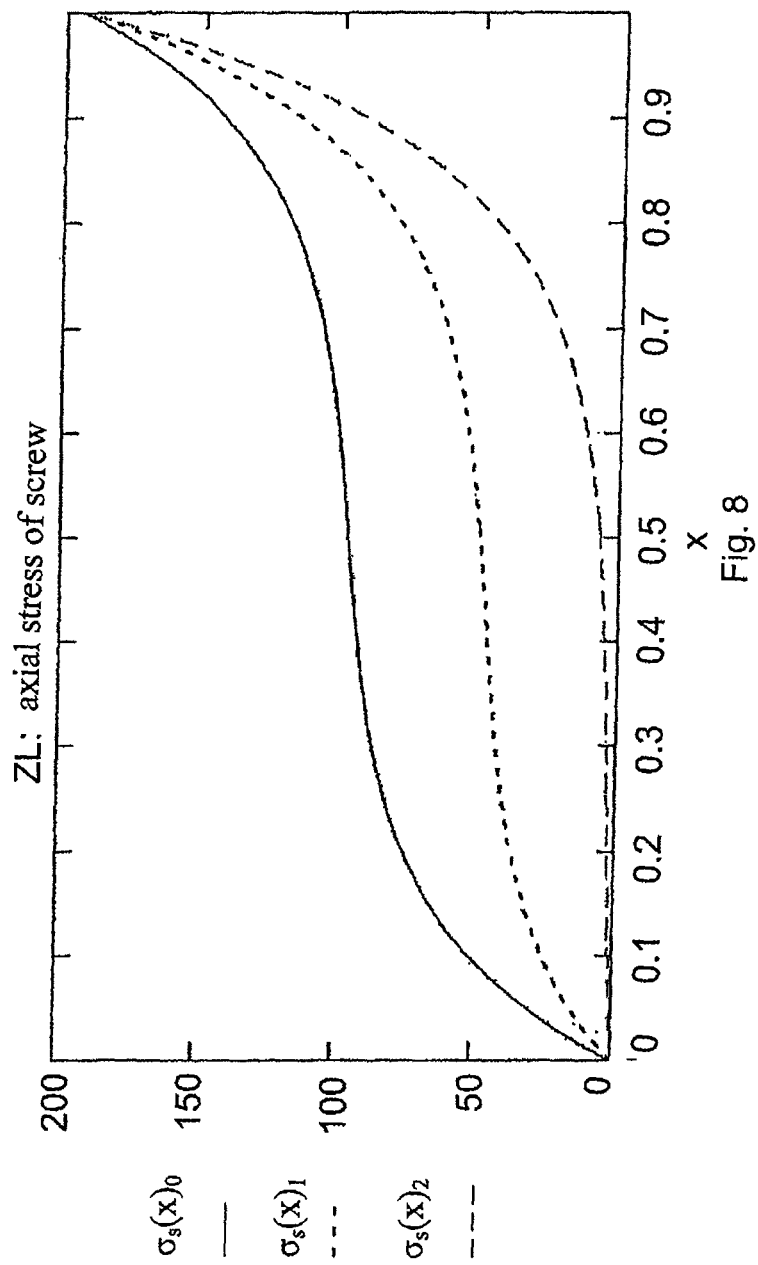

FIG. 7 shows the axial stress $\sigma_s(x)$ in the screw for the three Cases 0, 1 and 2 over the length of the bond in the case of a compressive load and FIG. 8 shows it in the case of a tensile load.

Figure 9:
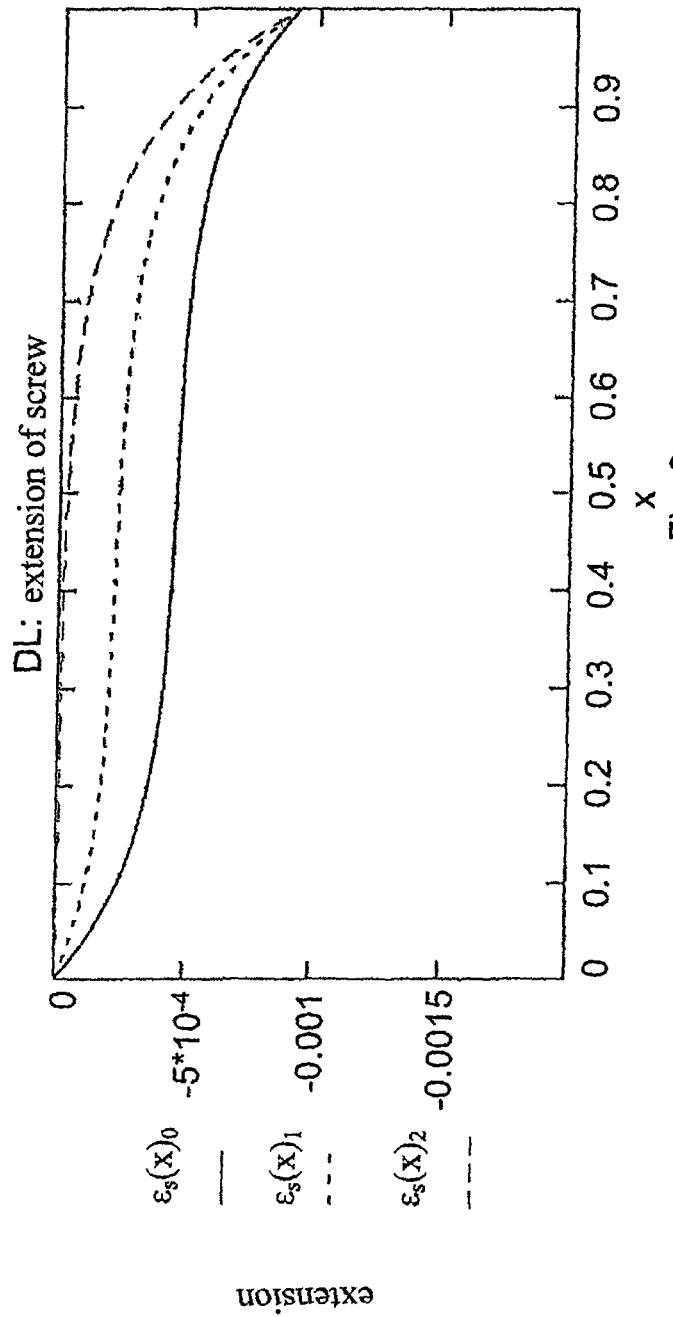
FIGS. 9 and 10 show the course or curve for the extension of the screw for the cases of FIG. 1 and FIG. 2, respectively.
Figure 10:
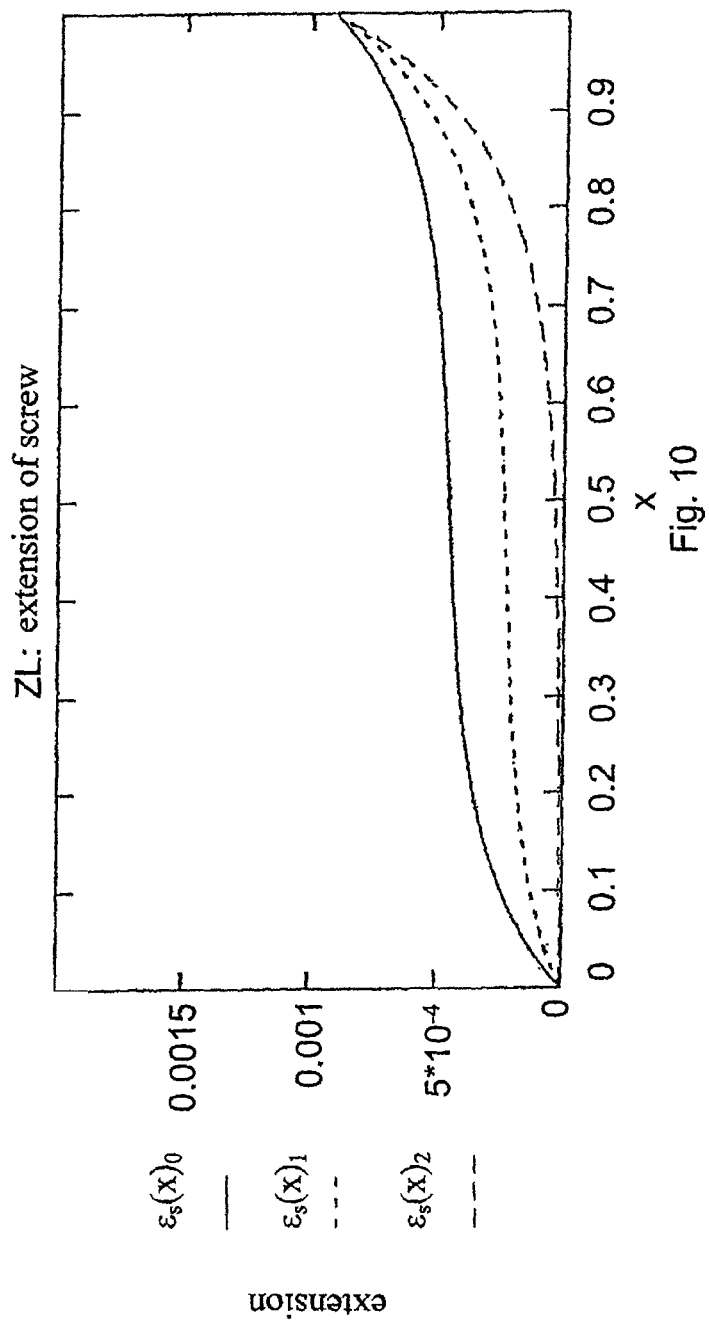

FIG. 9 shows the extension $\epsilon_s(x)$ in the screw for the three Cases 0, 1 and 2 for the case of a compressive load and FIG. 10 shows it for the case of a tensile load. By comparing the FIGS. 3 to 6 on the one hand and the FIGS. 7 to 10 on the other hand one can see the complementary course in stress and extension between component and screw.

As was explained in the preceding section 1, an internal stress in the bond that even acts without load can be created by means of a suitable variation of the lead of the thread of the screw. According to the invention, the variation of the lead should lead to a bond stress $\tau_{ES}(x)$ as a consequence of the internal stress, which bond stress acts against the bond stress under load shown in FIGS. 1 and 2 in such a manner that the peaks in the bond stress under load are compensated at least to some extent.

Figure 11:
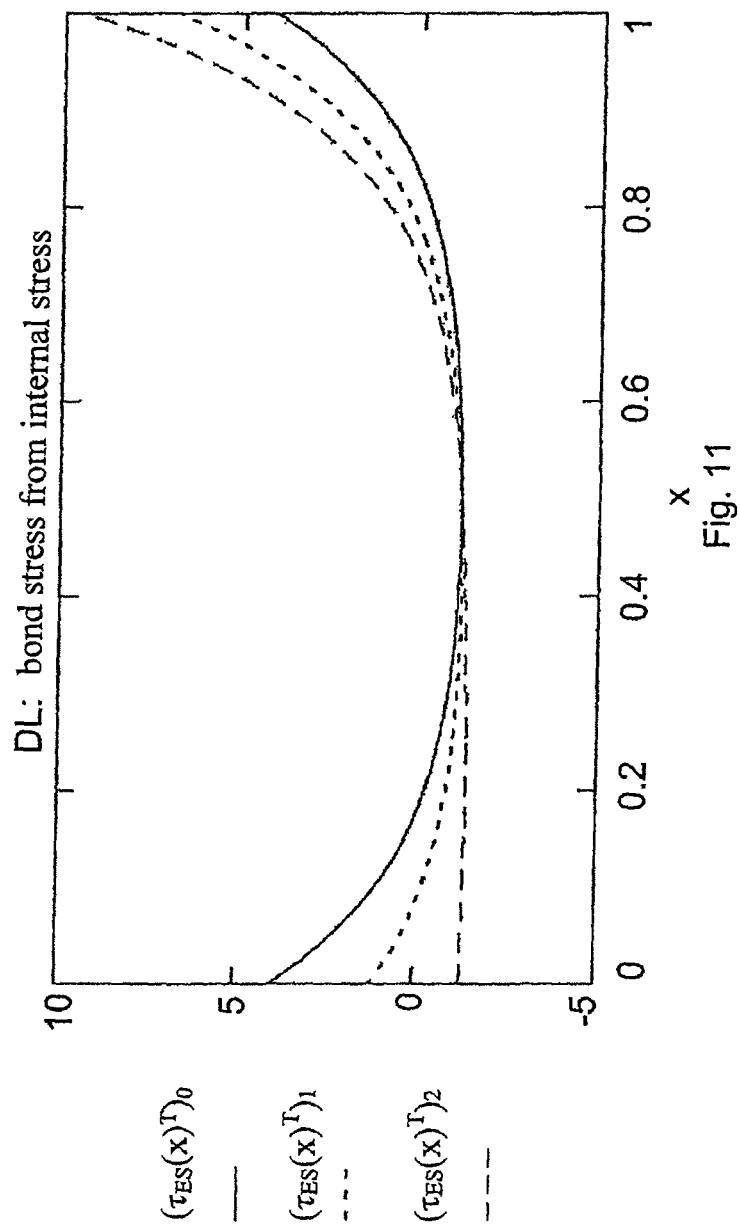
FIGS. 11 and 12 show courses or curves of suitable bond stresses which are created by internal stress in order to compensate the maxima of the bond stresses of FIGS. 1 and 2, respectively, at least to some extent.

In FIG. 11, three bond stress courses $\tau_{ES}(x)$ of the internal stress for the case of compressive load are shown for the Cases 0, 1, and 2, which bond stress courses act against the bond stress $\tau(x)$ under load of FIG. 1 and are therefore suitable to compensate the latter at least to some extent.

Figure 12:
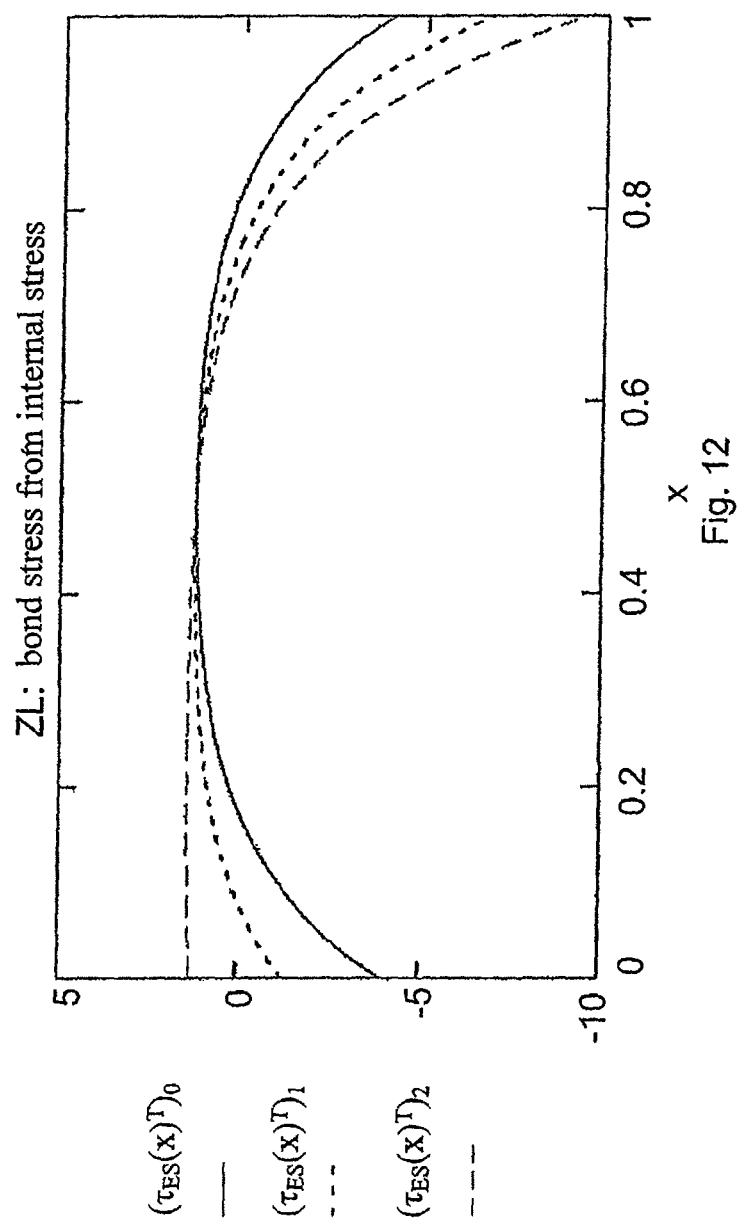

The bond stresses $\tau_{ES}(x)$ of the internal stress for the Cases 0, 1 and 2 are shown in a similar manner in FIG. 12, which bond stresses act against the bond stresses under tensile load of FIG. 2.

Figure 13:
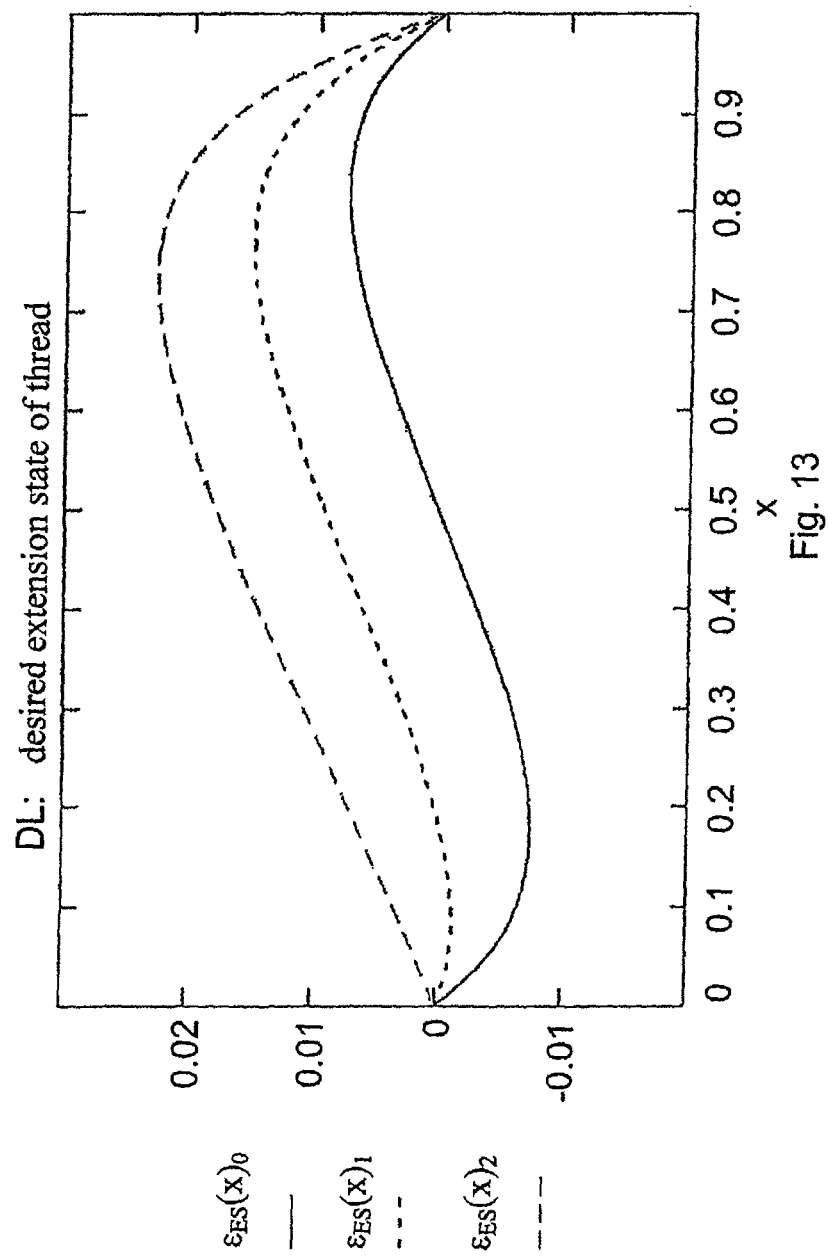
FIGS. 13 and 14 show courses or curves of extension states of the thread on account of the internal stress.
Figure 14:
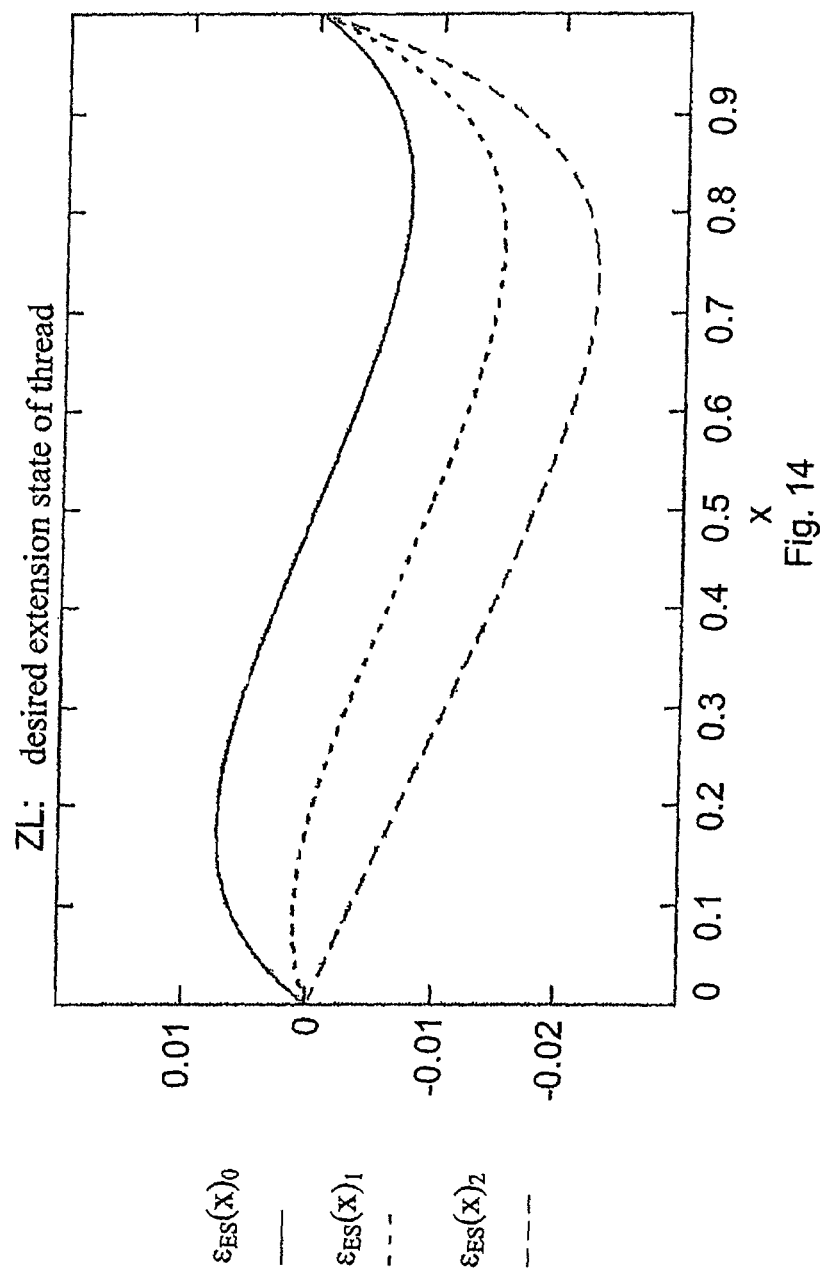

FIGS. 13 and 14 show the extension $\epsilon_{ES}(x)$ of the component caused by the internal stress, which extension is related to the bond stress $\tau_{ES}(x)$ of the internal stress according to Equation (9). The extension courses $\epsilon_{ES}(x)$ of FIGS. 13 and 14 can be used in accordance with Equation (14), in order to calculate the directrix curve of the screw, which directrix curve creates the desired internal stress.

As was already explained at the beginning, the starting point for the designing of the screw is the choice of the desired course of the bond stresses $\tau_{ES}(x)$ of the internal stress of FIGS. 11 and 12 or the desired course of the extension of the component $\epsilon_{ES}(x)$ under the internal stress of FIGS. 13 and 14. The most obvious choice would be to invert the bond stress $\tau(x)$, as are shown in FIGS. 1 and 2, in order to obtain the desired bond stress $\tau_{ES}(x)$ of the internal stress. A bond stress of the internal stress of this type in actual fact cannot necessarily be created, because they cannot be reconciled with the condition of disappearing virtual work in accordance with Equations (10) and (11). Instead, in the example shown here, for the course of the extension $\epsilon_{ES}(x)$ of the component as a consequence of the internal stress, an ansatz with a linear combination of weighting functions and the solution for the extensions of the component $\epsilon_t(x)$ under load was made:

$$\epsilon_{ES}(x) = -[fka_0(x)*(\epsilon_t(x)-\epsilon_t(0))+fka_1(x)*(\epsilon_t(x)-\epsilon_t(1))] \qquad (15)$$

wherein the weighting functions $fka_0(x)$ and $fka_1(x)$ are defined as follows:

$$fka_0(x) = \Sigma_{i=0}^n a_{0,i}*(1-x)^i \; fka_0(1)=0$$

$$fka_1(x) = \Sigma_{i=0}^n a_{1,i}*(x)^i \; fka_1(0)=0$$

By means of a suitable choice of the coefficients $a_0,i$ and $a_1,i$ in the weighting functions, the desired course of $\epsilon_{ES}(x)$ can then be generated.

Figure 15:
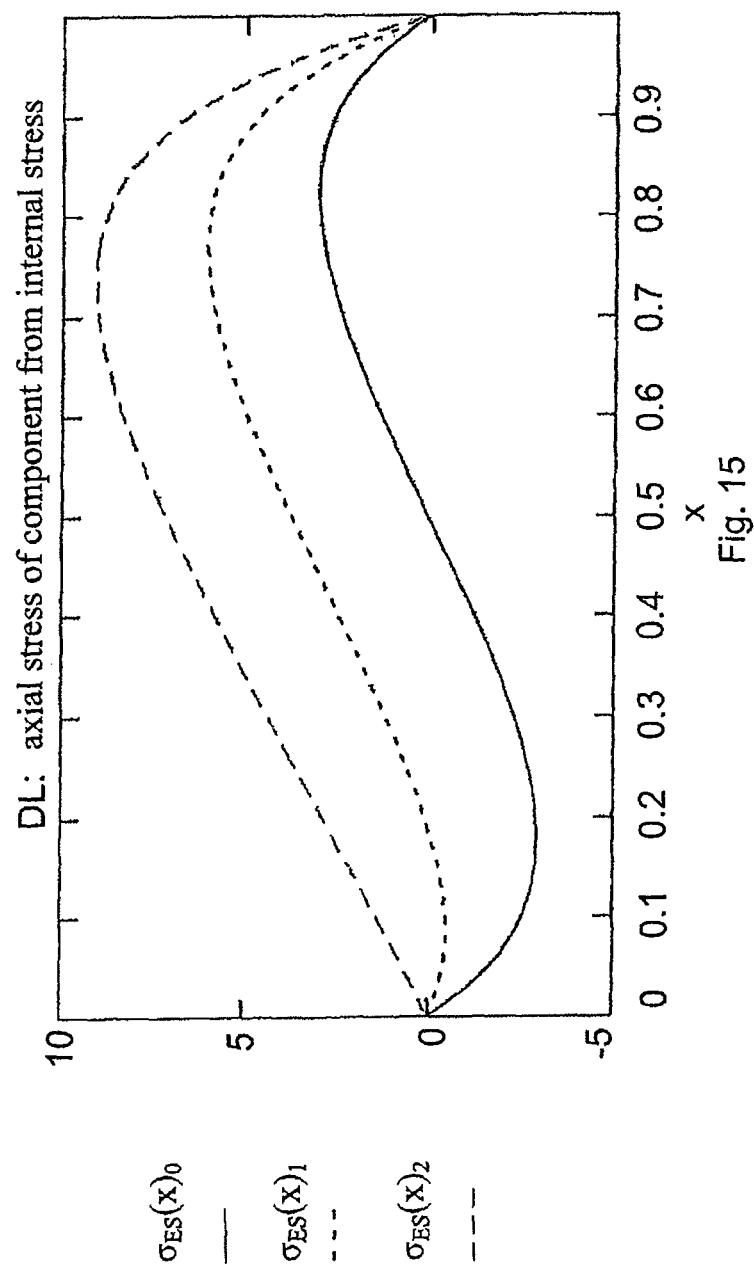
FIGS. 15 and 16 show courses or curves of axial stresses in the component on account of the internal stress.
Figure 16:
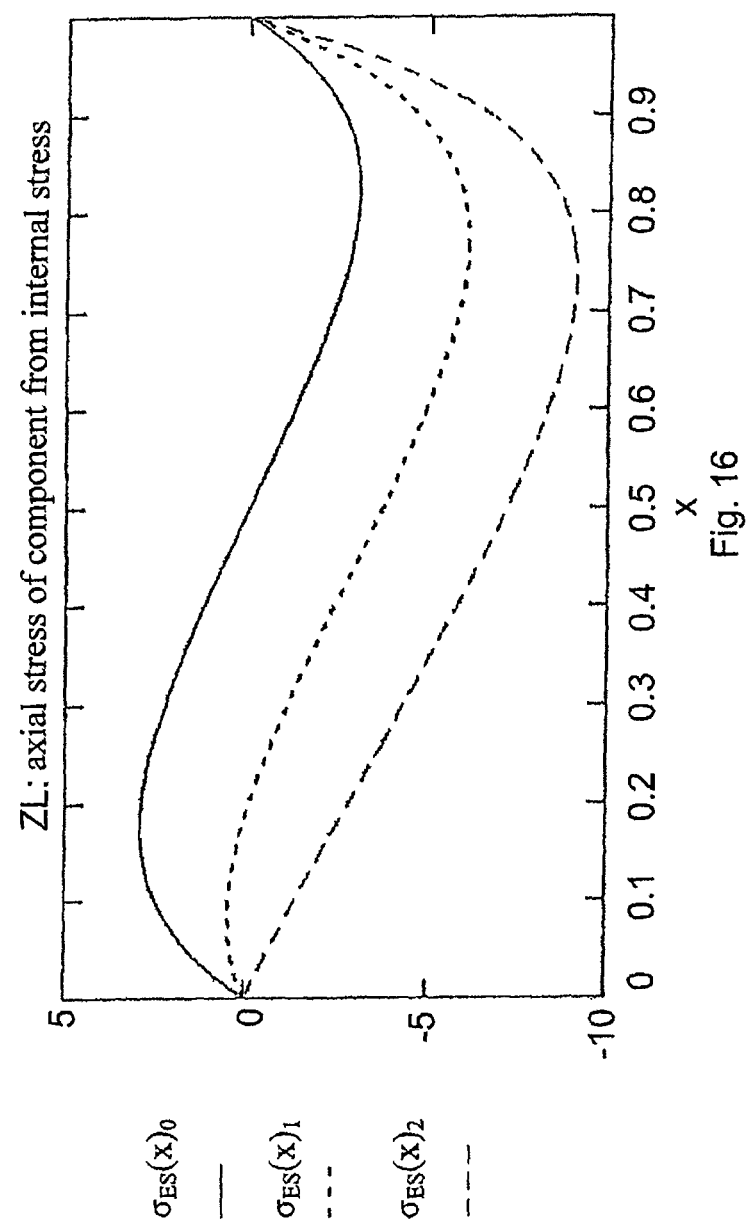
Figure 17:
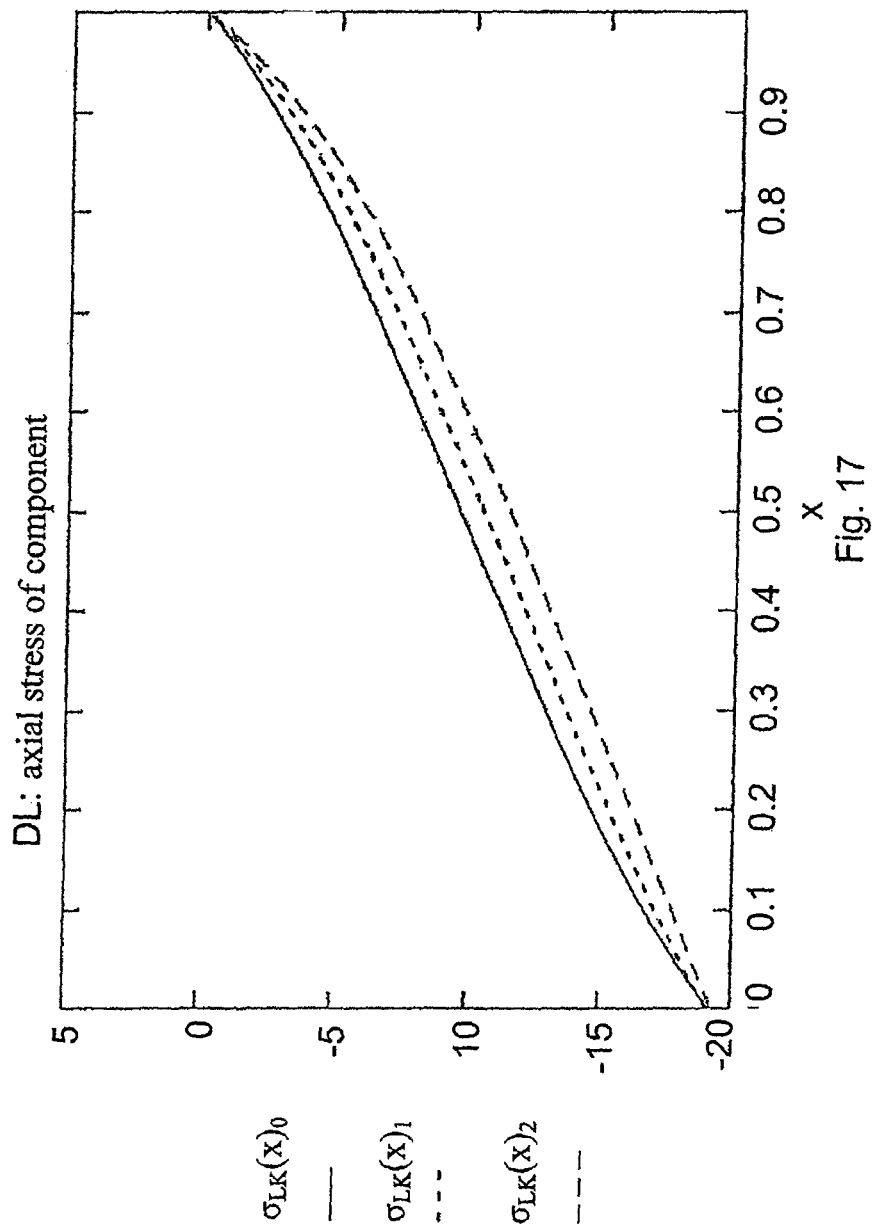
FIGS. 17 and 18 show courses or curves of axial stresses in the component as result due to the combination of internal stress and external load.
Figure 18:
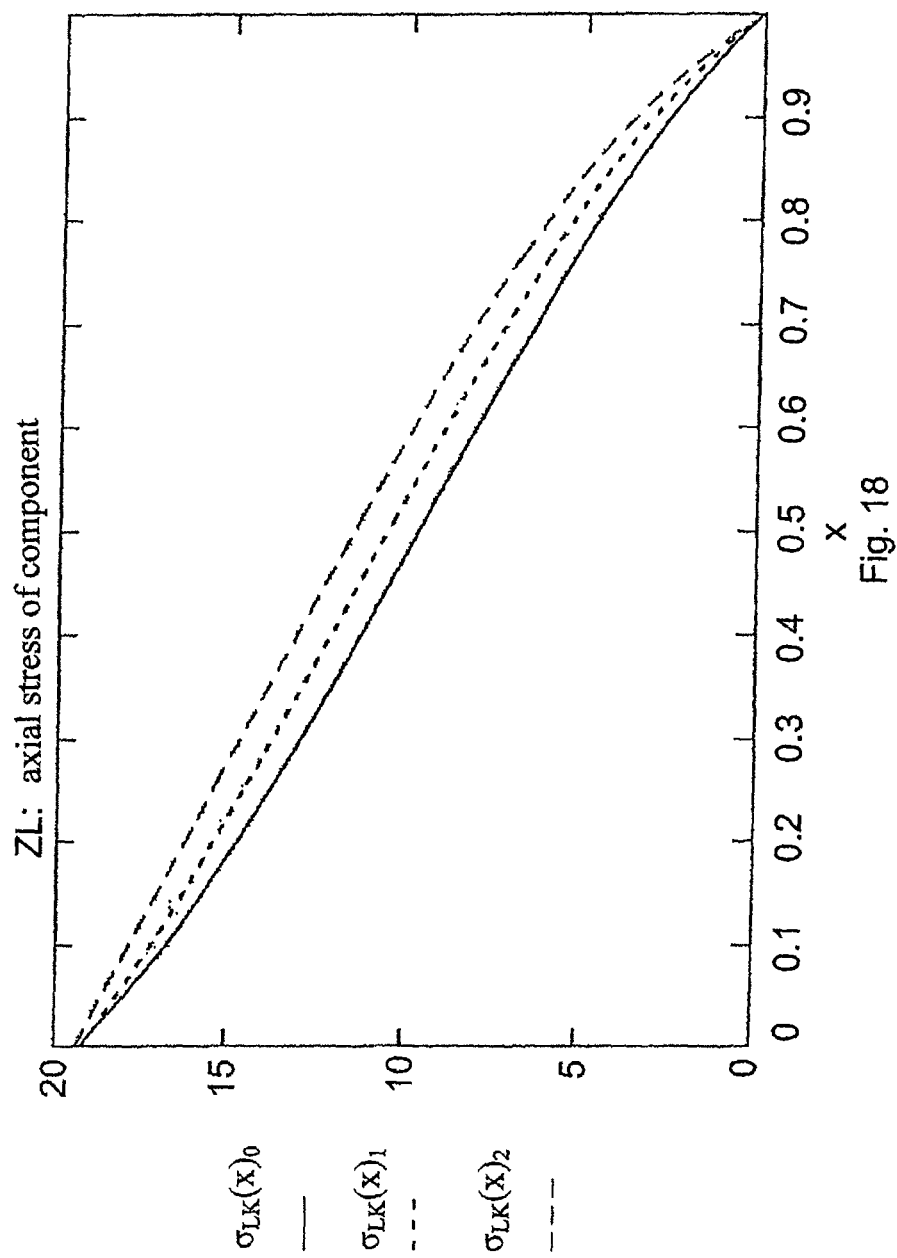

The course of the axial stress $\sigma_{ES}(x)$ caused by the internal stress for the three Cases 0, 1 and 2 is shown in FIG. 15 for compressive loading and in FIG. 16 for tensile loading. FIGS. 17 and 18 show the combined axial stress in the component if both the internal stress and the load apply. This combined axial stress is here designated with $\sigma_{LK}(x)=\sigma_\tau(x)+\sigma_{ES}(x)$. As can be seen from FIGS. 17 and 18, for the combined axial stress $\sigma_{LK}(x)$ an axial stress results which rises or falls uniformly over the length of the bond. This uniform increase or fall of the axial stress is substantially more tolerable for the bond than the locally strongly changing axial stresses under load without internal stress distribution according to the invention, as occur in FIGS. 3 and 4 in particular at the beginning of the bond between x=0.7 and x=1. Due to the uniform stress course, stress peaks in the bond stress are avoided and the resistivity of the bond is strengthened.

Figure 19:
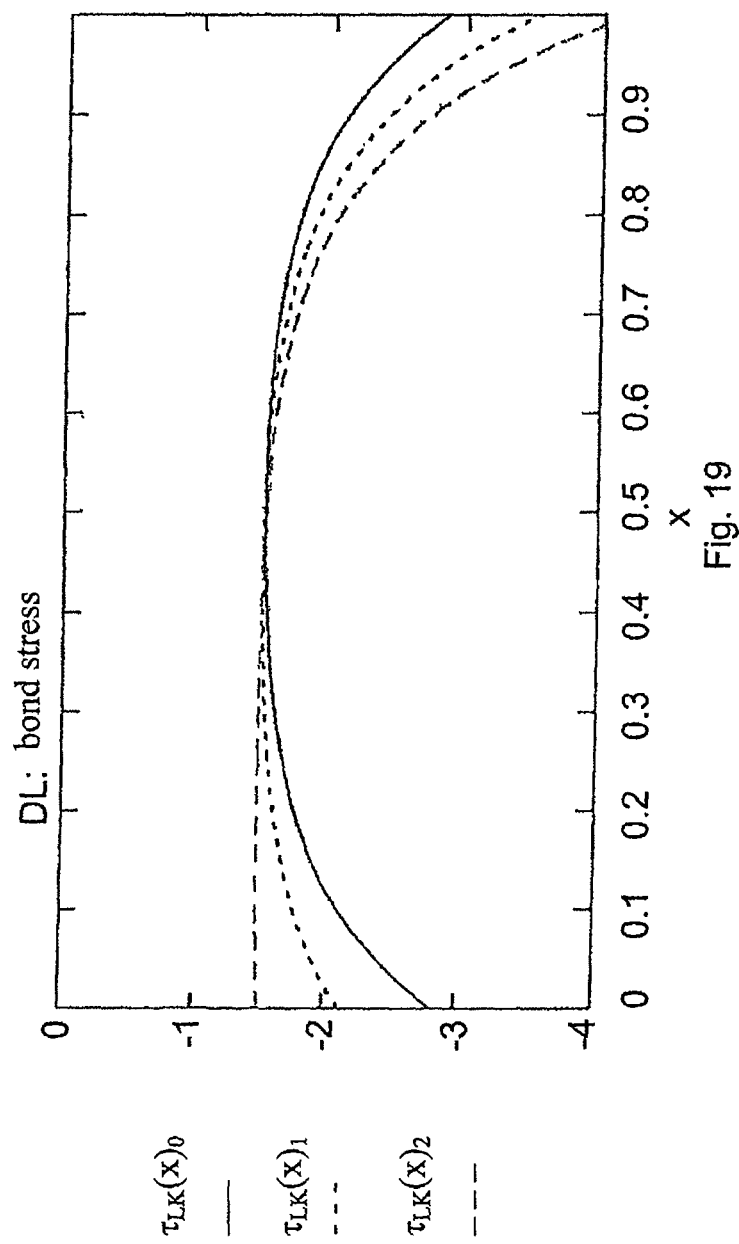
FIGS. 19 and 20 show courses or curves of combined bond stresses which result from a superposition of the bond stress due to an external load and the bond stress due to the internal stress.
Figure 20:
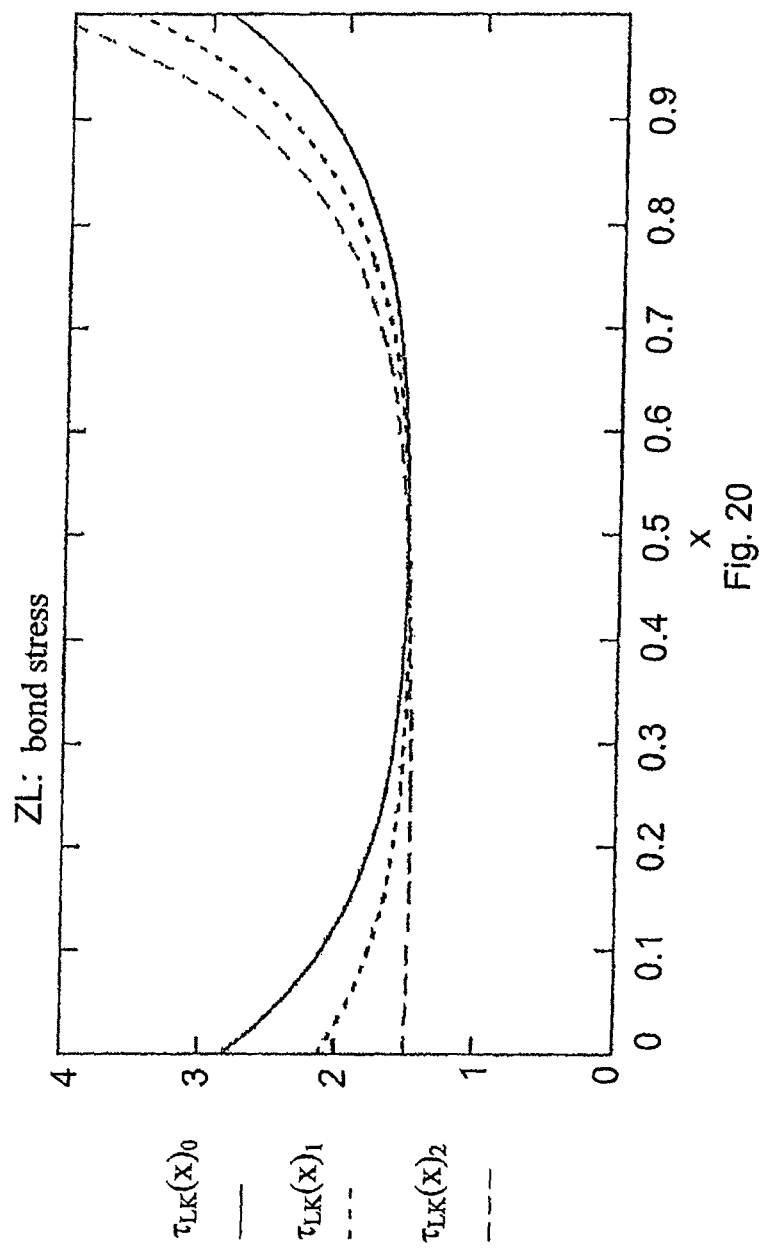
Figure 21:
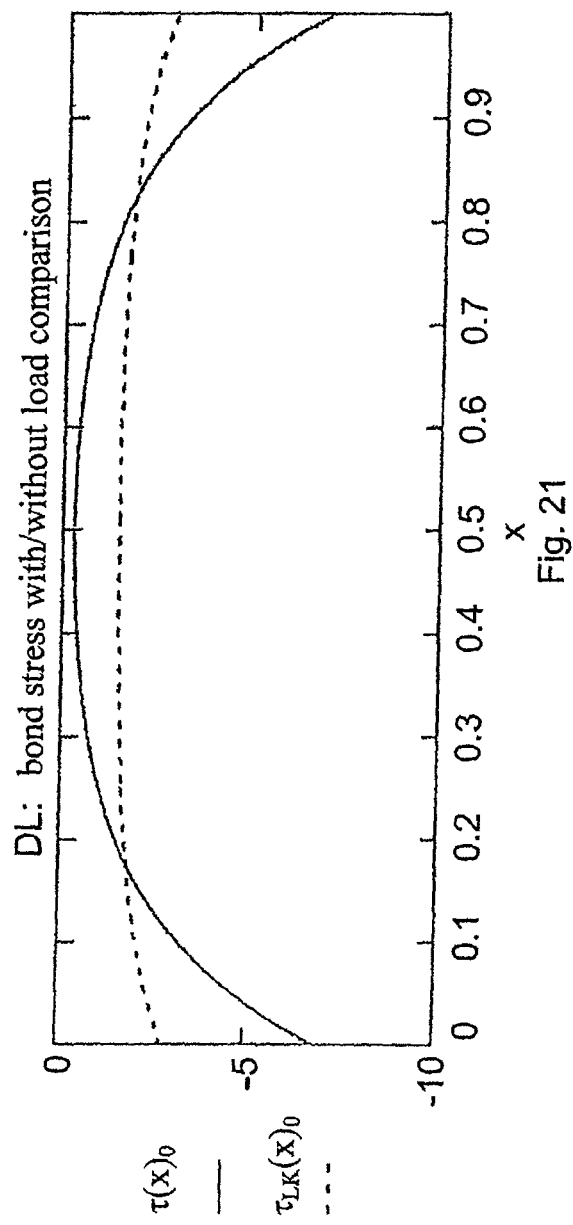
FIGS. 21 to 26 in each case show the comparison between the combined bond stress and the bond stress from the load on its own.
Figure 22:
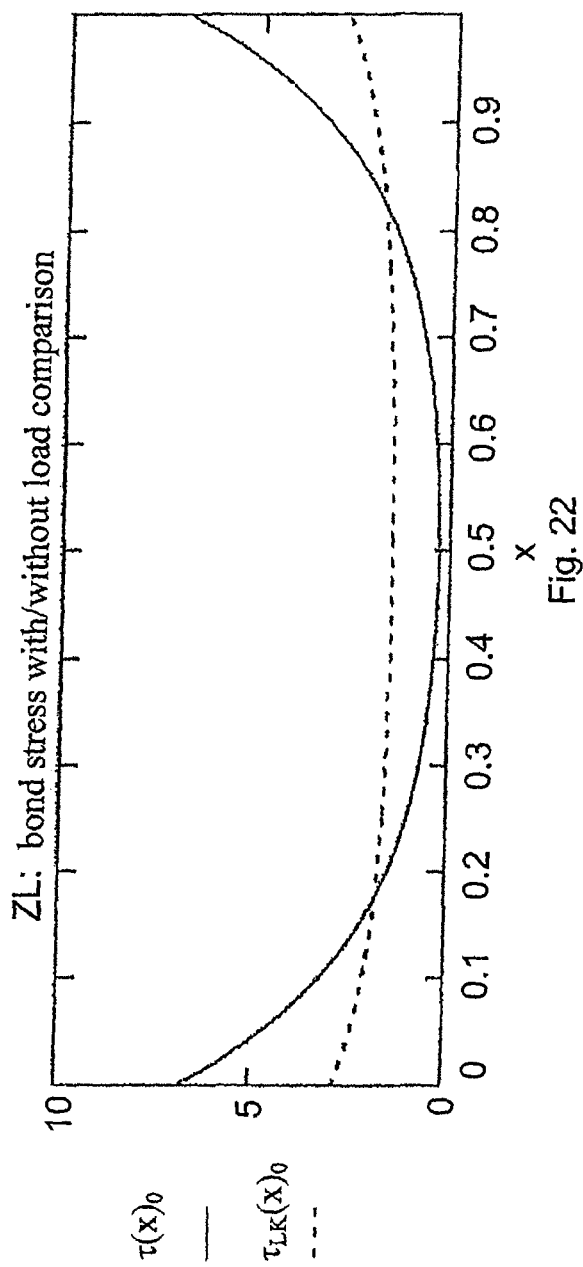
Figure 23:
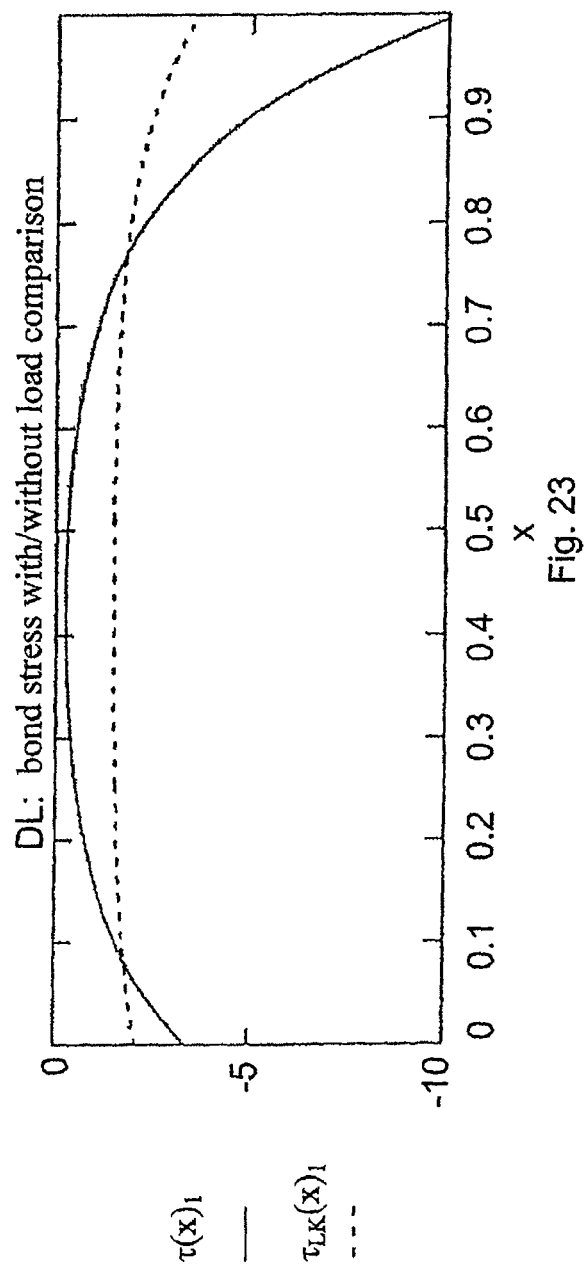
Figure 24:
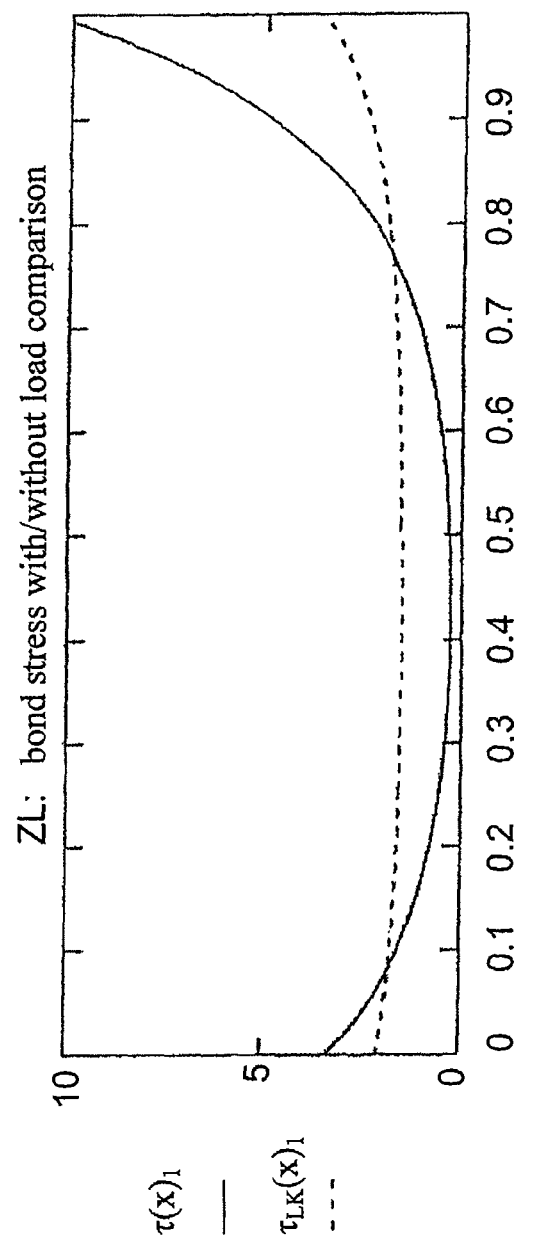
Figure 25:
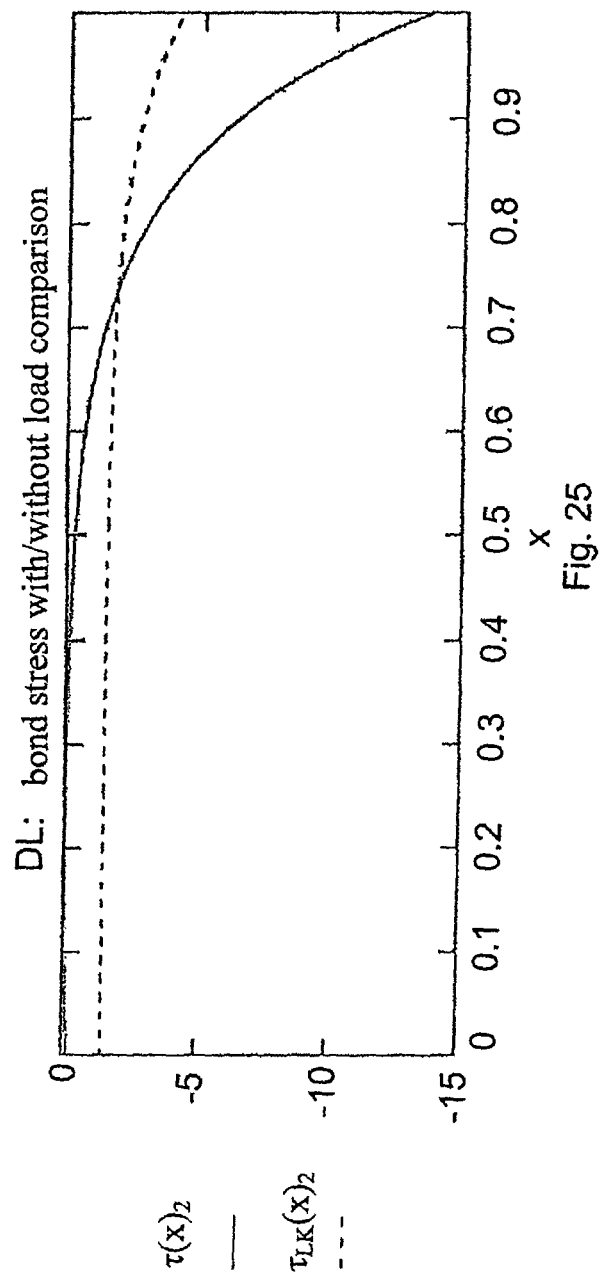
Figure 26:
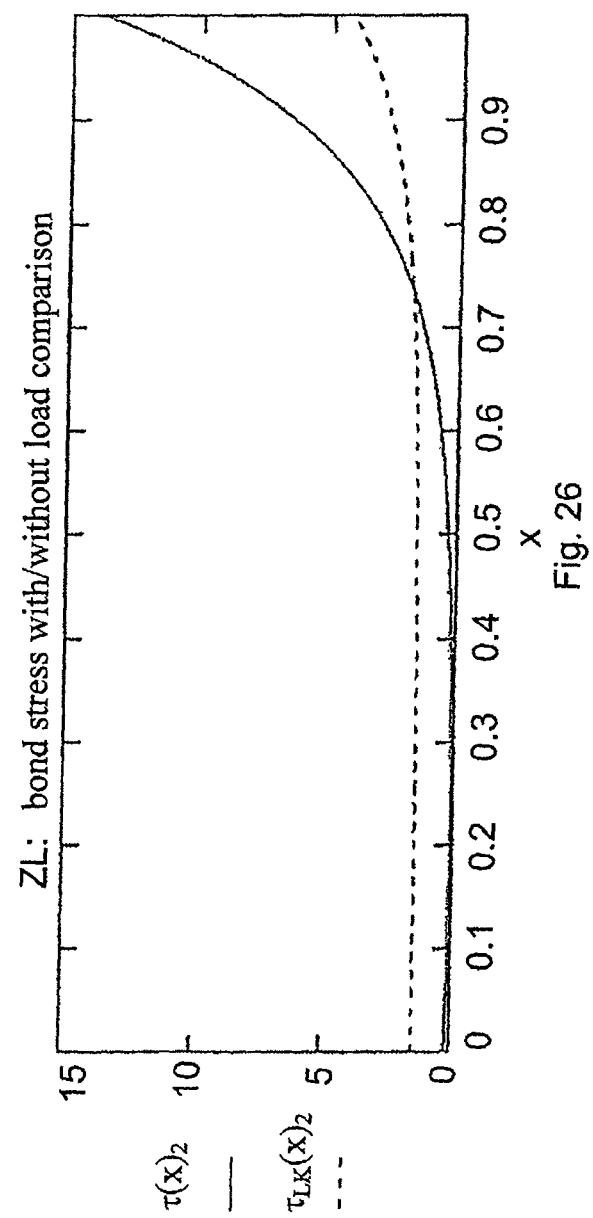

FIGS. 19 and 20 show the combined bond stress $\tau_{LK}(x)$, which corresponds to the sum of the bond stress $\tau(x)$ under load and the bond stress $\tau_{ES}(x)$ caused by the internal stress. Although the combined bond stress still has maxima at the beginning of the bond, these are by far less pronounced than in the case of the bond stress $\tau(x)$ caused by the load alone, as can be discerned from the FIGS. 21 to 26, in which for the different Cases 0, 1 and 2 and for compressive and tensile loading, the bond stress $\tau(x)$ caused by the load and the combined bond stress $\tau_{LK}(x)$ are compared. As can be discerned from FIGS. 21 to 26, the peaks of the combined bond stress $\tau_{LK}(x)$ can, by means of the variation of the thread lead of the screw according to the invention, be reduced to about a third of the peaks of the bond stresses $\tau(x)$, as would result in the case of a uniform thread lead under load.

As can be discerned from the FIGS. 21 to 26, the combined bond stress $\tau_{LK}(x)$ is on average just as high as the bond stress $\tau(x)$ under load, only it is distributed more uniformly over the bond length, so that the peaks in the bond stress are reduced. It is immediately clear from Equations (10) and (11) that the average bond stress cannot be changed, because the virtual work of the internal stress is zero, and this is also not the purpose of the invention. Rather, in the case of the load introduction, a certain net bond stress must be present in order to be able to transfer force from the screw onto the component. The purpose of the invention is rather to create a more uniform course of the combined bond stress and, as a result, to reduce peaks in the bond stress at which the bond could otherwise fail.

Figure 27:
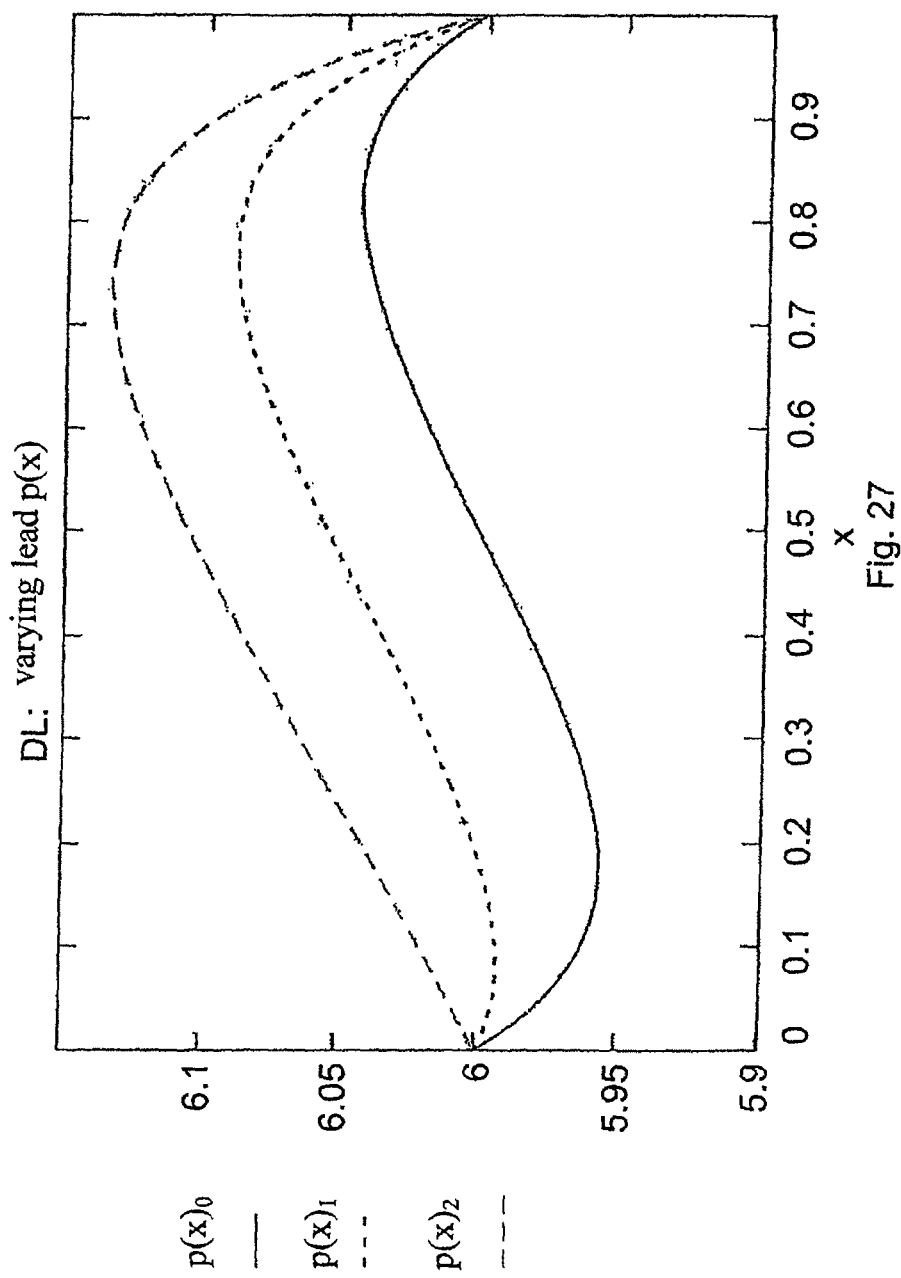
FIGS. 27 and 28 show the courses of thread leads which lead to the courses for the internal stress which form the basis of FIGS. 11 to 26.

In FIG. 27, the course of the variable thread lead p(x) is shown as it results in accordance with Equations (12) and (13) for the three Cases 0, 1 and 2 according to the courses of the extension $\epsilon_{ES}$ of FIG. 13. As the internal stress courses $\tau(x)_0$, $\tau(x)_1$ and $\tau(x)_2$ of FIG. 1 are typical for load introduction of a thrust load into a component, FIG. 27 shows the typical course of a variable thread lead by which the peaks in the bond stress of FIG. 1 can be compensated at least to some extent. In all three cases, the course of the thread lead is characterised by a maximum in the second half of the thread, that is to say in the range from 0.5<x<1. A good effect with respect to the homogenisation of the bond stress $\tau$ can be achieved if this maximum is located between x=0.6 and 0.9, preferably between x=0.7 and x=0.85.

Further, the curvature of the graph of the thread lead changes in a middle section of the bond length, so that for the Case 0 and for the Case 1, a maximum results in the first half of the bond length, that is to say in the range 0<x<0.5. This maximum is preferably located in a range of 0.05<x<0.4 and particularly preferably in a range of 0.1<x<0.3.

Figure 28:
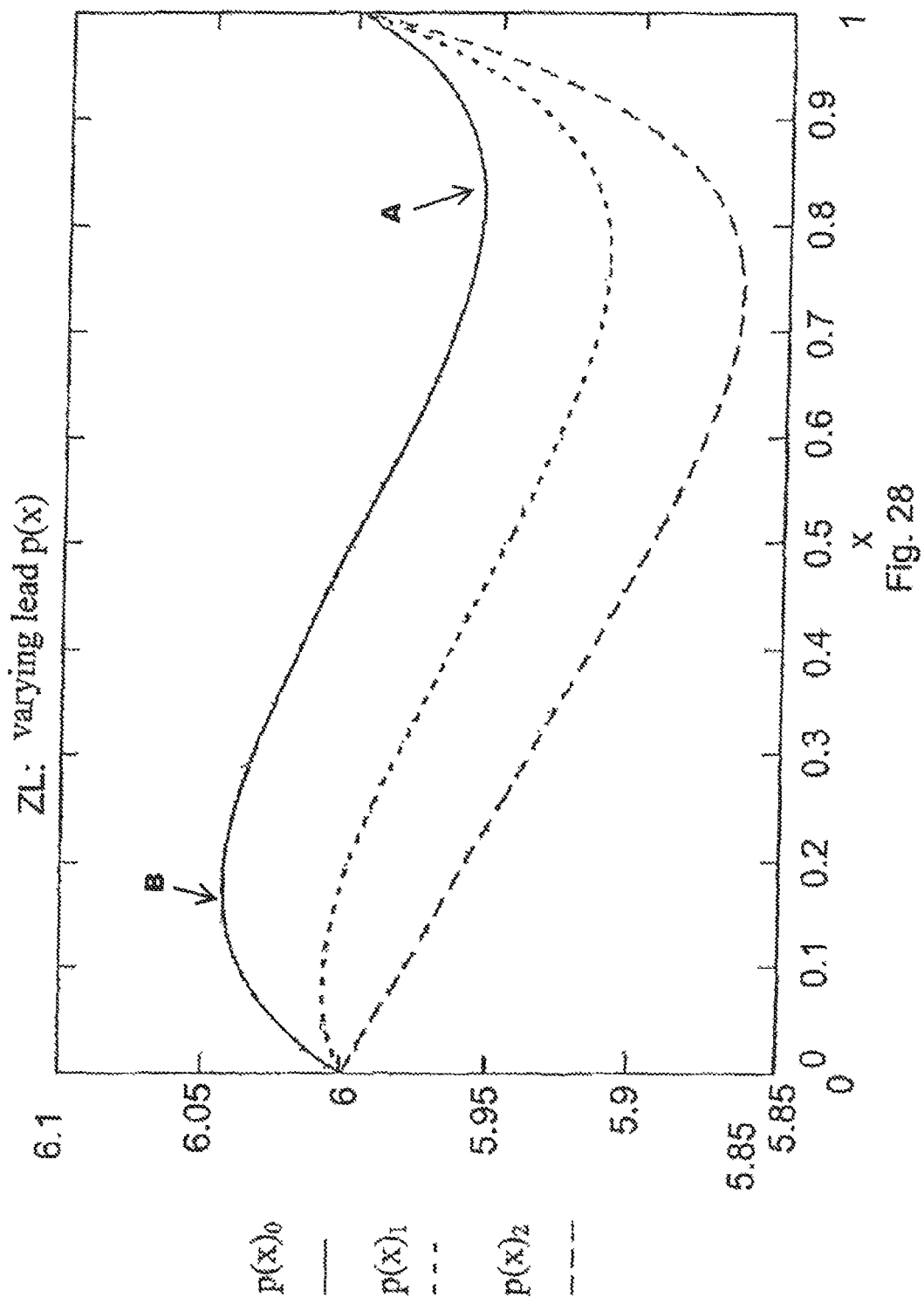
Figure 38:
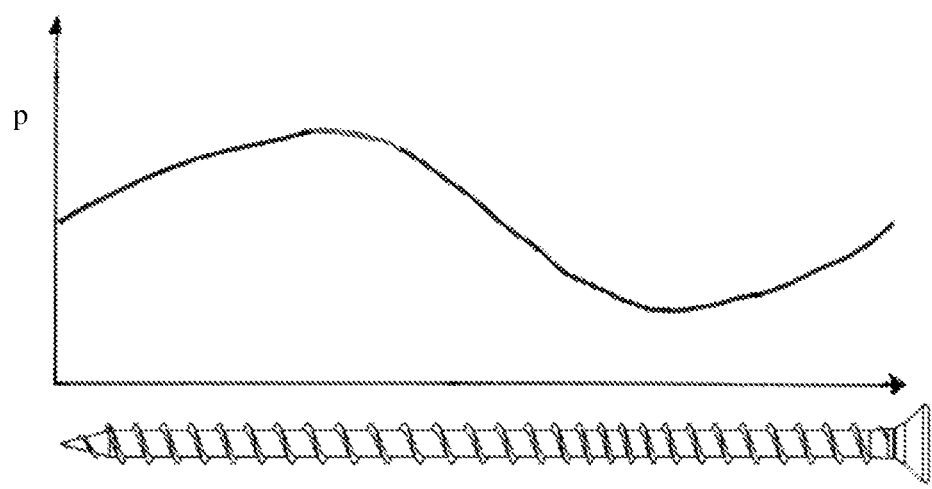
FIG. 38 depicts an embodiment of a screw having a first local extremum in a half of a thread adjacent to the second end but spaced from said second end, and a second local extremum located in a half of the thread adjacent to a first end but spaced from said first end.

As can be seen from FIGS. 28 and 38, the course for the case of a tensile loading is exactly the opposite, that is to say the thread lead has a minimum in the second half and optionally a maximum in the first half of the bond length.

These standard courses of the thread lead for the introduction of compressive or tensile load can be provided for standard applications in which the thread lead is not adjusted to the bond stress actually expected or calculated for the individual case. Instead, it is possible for certain material combinations, for example threaded rods or screws made from steel with components made from solid wood or concrete, to produce standard screws or threaded rods which have a standard variation of the thread lead, as was described above. Using standard screws or threaded rods of this type, the maximum bond stress occurring under load can still be significantly attenuated, even if the full potential of the invention is not utilised with a standard solution of this type. For this reason, the standard screws or threaded rods can be produced cost effectively in large piece numbers and they still represent a substantial improvement compared to conventional screws or threaded rods with constant thread lead.

3. Exemplary Embodiment: Reinforcement

Also in the case of a reinforcement with a screw or threaded rod, peaks in the bond stress under load can be compensated at least to some extent by means of a suitable internal stress distribution. The rationale for designing the suitable reinforcement screw or threaded rod is similar to that of the previously mentioned case of load introduction. An essential difference exists, however, in the fact that, in the case of the reinforcement, a comparable typical bond stress course as is shown in FIGS. 1 and 2 for the load introduction does not necessarily exist, instead, the spectrum of possible bond stress courses under load is broader and more complex. The bond stress between the component and the reinforcement which will occur under load depends on the overall construction of the component and its load. It is however generally possible to predict bond stresses between the component and the reinforcement by means of analytical calculations or computer simulations, and then the directrix curve of the thread can be calculated in the manner described above such that the internal stress created actually compensates the peaks in the bond stress.

In the following examples for the reinforcement, an analytical model with replacement cylinder is used as well. The following boundary conditions are to be taken into consideration for the reinforcement:
1. The virtual work of the internal stress over the bond length must be zero, and
2. the axial stresses for x=0 and x=1 must be zero.

In the following, it is assumed that a suitable internal stress state $\sigma_{ES}(x)$ should be created by the reinforcement. Then we make the ansatz $$\sigma_{ES}(x)=\sigma_0 * f(x) \tag{16}$$

wherein f(x) is an ansatz function with f(0)=0 and f(1)=0. $\sigma_0$ corresponds to the sought for absolute value of the maximum prestress.

The corresponding extension state then results as follows:

$$\varepsilon_{ES}(x) = \frac{\sigma_{ES}(x)}{E_t} - \varepsilon_{mES} = \frac{\sigma_0 * f(x)}{E_t} - \varepsilon_{mES}, \tag{17}$$

wherein $\varepsilon_{mES}$, the average extension, is given as:

$$\varepsilon_{mES} = \int_0^1 \frac{\sigma_0 * f(t)}{E_t} dt = \frac{\sigma_0}{E_t} \int_0^1 f(t)dt \tag{18}$$

The directrix curve according to the above Equation (16) can then in turn be calculated from the course of the extension $\varepsilon_{ES}(x)$ caused by the internal stress.

Figure 29:
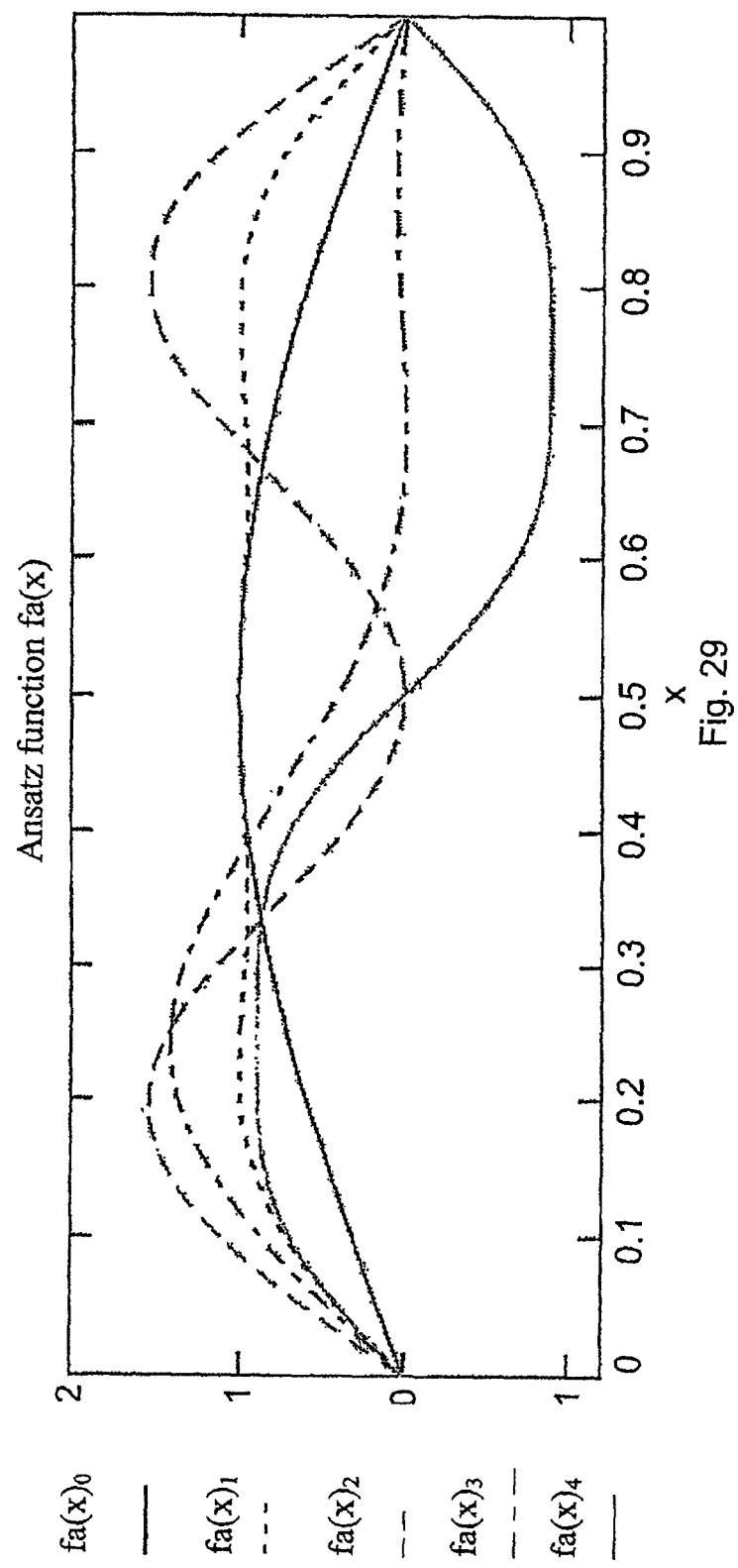
FIG. 29 shows five ansatz functions for the designing of an internal stress distribution for a reinforcing bond.

The ansatz function f(x) is to be chosen in such a manner that it comes as close as possible to the inverted stress state under loading whilst complying with the boundary conditions. FIG. 29 shows the ansatz functions f(x) which are characterised with indices from 0 to 4 and are used in typical reinforcement applications. In this case
$f(x)_0$: corresponds to a symmetrical ansatz function with parabolic course over the anchoring length,
$f(x)_1$: corresponds to a symmetrical ansatz function which rises, then is virtually constant over a wide stretch and then falls again,
$f(x)_2$: corresponds to a symmetrical ansatz function with two maxima and a minimum,
$f(x)_3$: corresponds to an asymmetrical ansatz function, and
$f(x)_4$: corresponds to an ansatz function with tensile and compressive state over the anchoring length.

Figure 30:
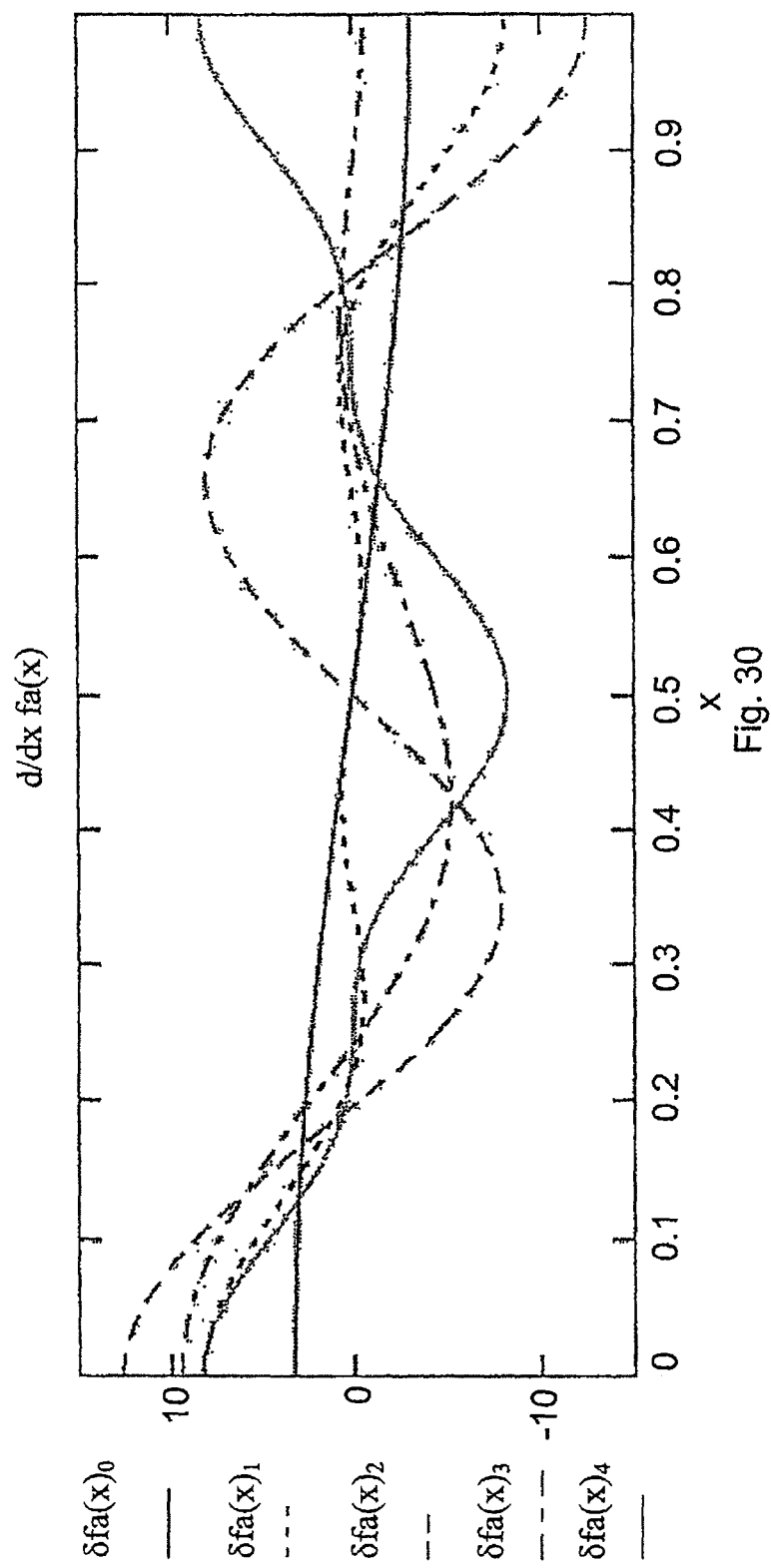
FIG. 30 shows the first derivative of the functions of FIG. 29.

FIG. 30 shows the first derivative of the functions $f(x)_0$ to $f(x)_4$ from FIG. 29.

Figure 31:
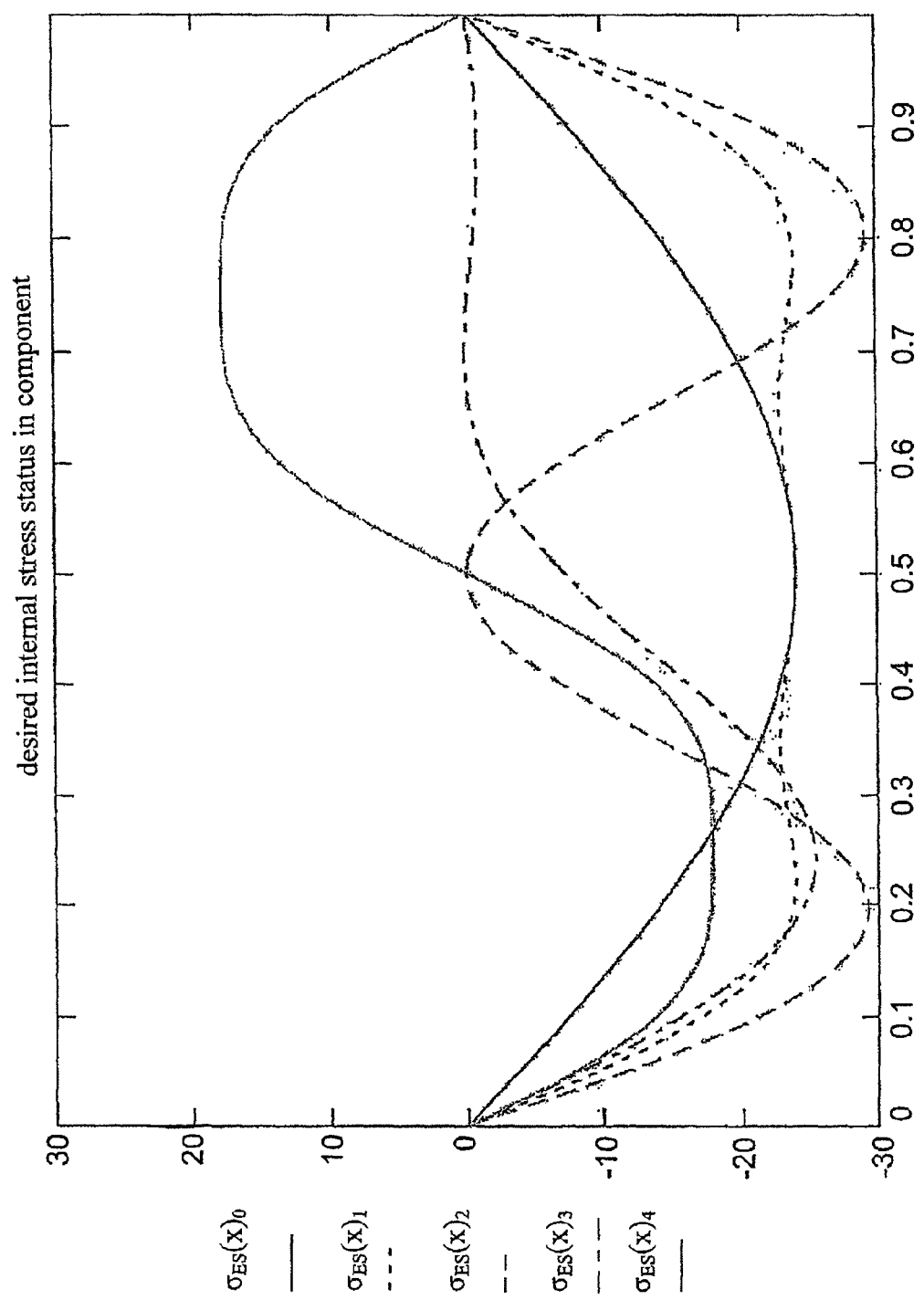
FIG. 31 shows five internal stress states in the component, as result from the functions of FIGS. 29 and 30.
Figure 32:
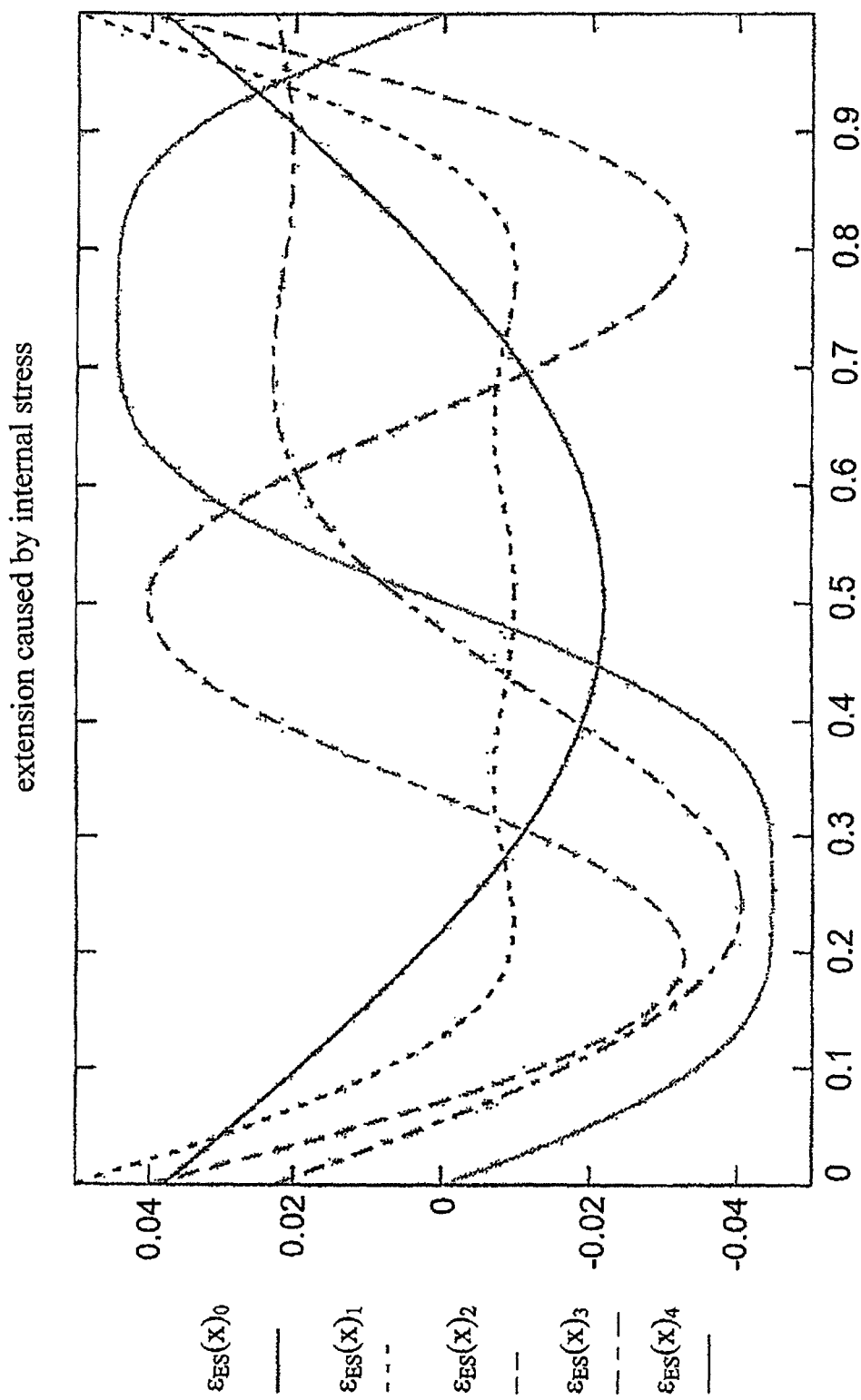
FIG. 32 shows courses or curves of extensions in the component on account of the internal stress states of FIG. 31.
Figure 33:
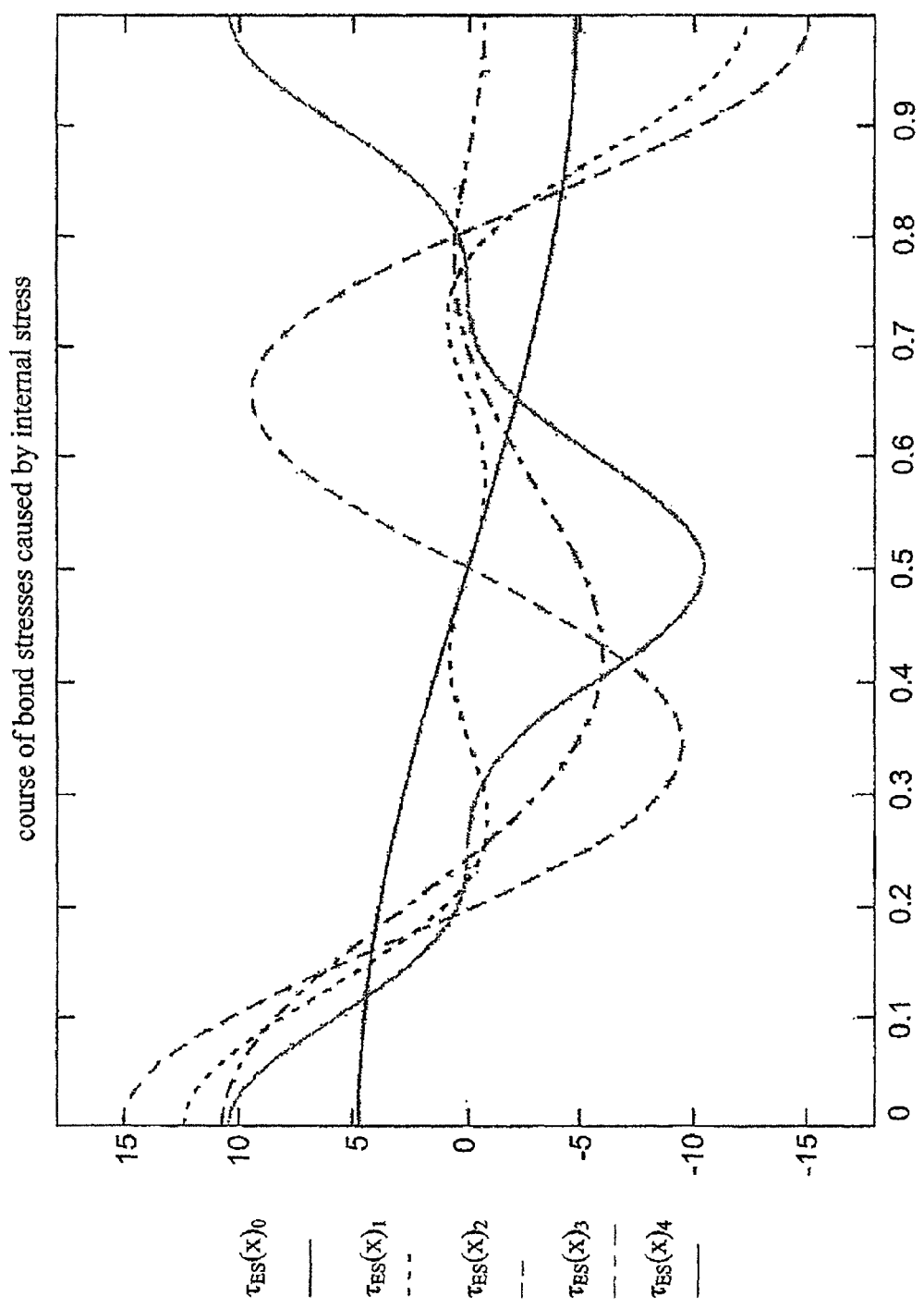
FIG. 33 shows courses or curves of the bond stresses due to the internal stress for the cases of FIGS. 29 to 32.
Figure 34:
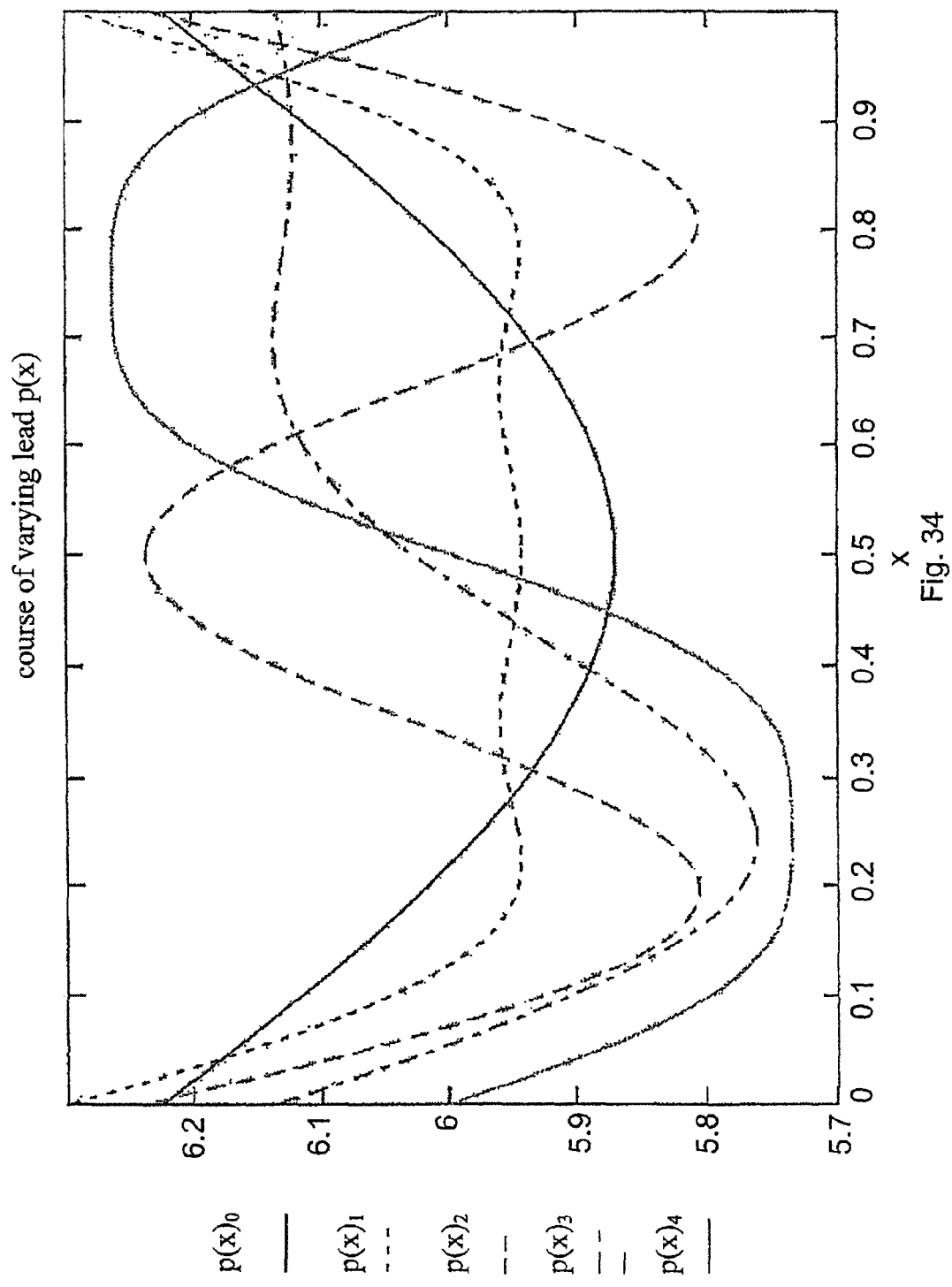
FIG. 34 shows the courses or curves of the thread leads which create the bond stresses of FIG. 33.

FIG. 31 shows the stress courses $\tau_{ES}(x)_0$ to $\sigma_{ES}(x)_4$ corresponding to the ansatz functions $f(x)_0$ to $f(x)_4$, and FIG. 32 shows the associated courses of the extension $\varepsilon_{ES}(x)$. FIG. 33 shows the courses of the bond stresses as are created due to the internal stress. Finally, FIG. 34 shows the associated courses of the variable lead.

Amongst the five ansatz functions presented, the function $f(x)_1$ is particularly to be highlighted. As can be discerned from FIG. 31, a stress course $\varepsilon_{ES}(x)_1$ results for this case, in which $\sigma_{ES}(x)_1$ falls relatively quickly to a negative value between x=0 and x=0.2, remains approximately constant at this low value between x=0.2 and x=0.8 and then rises again to 0 between x=0.8 and x=1. In other words, this case leads to an internal stress of the reinforcement for which the component is kept under a constant compression over the largest part of the reinforcement length. This internal stress distribution results form the course of the thread lead $p(x)_1$ which falls in a first section between x=0 and x=0.2 by a value $\Delta p$, which in the exemplary embodiment shown is approx. 0.3, remains below $p(x=0)_1-\Delta p$ in a middle section between x=0.2 and x=0.8 and only rises above the value $p(x=0)_1-\Delta p$ again in a third section between x=0.8 and x=1.

Although, as mentioned at the beginning, there are fewer standard applications for reinforcement than for load introduction, there is indeed a wide range of applications for a reinforcement which creates a constant compression over a large proportion of the bond. Thus, at least the thread form in accordance with $p(x)_1$ represents a standard course which can be used in an advantageous manner as standard in reinforcements without carrying out a concrete investigation of the courses of the bond stress under loading. Instead of this, standard reinforcement screws can be produced for certain material combinations, in which the thread qualitatively has the course of $p(x)_1$ of FIG. 34, and these reinforcement screws lead in a large number of standard applications to substantially higher loading stability than conventional reinforcement screws or threaded rods with constant thread lead.

The features presented in the previous description can be of importance in any desired combinations.

The invention claimed is:
1. A screw or threaded rod with a thread having a thread lead that varies in a longitudinal direction of the screw or threaded rod, said thread being configured to be screwed into a component in order to form a bond with the component,
wherein said thread has a first end, which is a leading end when screwing the thread into the component, and a second end,
wherein the thread lead either
(i) has a local extremum in a half of the thread adjacent to the second end, but spaced from said second end, and lacks additional local extrema, or
(ii) has a first local extremum in a half of the thread adjacent to the second end but spaced from said second end and has a second local extremum located in a half of the thread adjacent to the first end but spaced from said first end, which second local extremum is opposite in curvature to the first local extremum such that if the second local extremum is a minimum, the first local extremum is a maximum, and vice-versa.

2. The screw or threaded rod according to claim 1, in which, assuming that a length of the thread is standardised to one, the first local extremum is located at a distance of 0.6 to 0.9 from the first end.

3. The screw or threaded rod according to claim 2, wherein the first local extremum is located at a distance of 0.7 to 0.85 from the first end.

4. The screw or threaded rod according to claim 1, in which, assuming that a length of the thread is standardised to 1, the second local extremum is located at a distance of 0.05 to 0.4 from the first end of the thread.

5. The screw or threaded rod according to claim 4, wherein the second local extremum is located at a distance of 0.1 to 0.3 from the first end of the thread.

6. The screw or threaded rod according to claim 1, wherein thread leads at said first and at second ends deviate from one another by less than 50% of an overall variation in the thread lead in the thread.

7. The screw or threaded rod according to claim 6, wherein thread leads at said first and at second ends deviate from one another by less than 30% of the overall variation in the thread lead in the thread.

8. The screw or threaded rod according to claim 6, wherein thread leads at said first and at second ends deviate from one another by less than 10% of the overall variation in the thread lead in the thread.

9. A screw or threaded rod with a thread having a thread lead that varies in a longitudinal direction of the screw or threaded rod, and comprising a bonding thread section that is screwed into a component in order to form a bond with the component, wherein said bonding thread section has a first end, which is a leading end when screwing in the bonding thread section, and a second end, wherein the thread lead either (i) has a local extremum in a half of the bonding thread section adjacent to the second end but spaced from said second end, and lacks additional local extrema, or (ii) has a first local extremum in a half of the bonding thread section adjacent to the second end but spaced from said second end and has a second local extremum located in a half of the bonding thread section adjacent to the first end but spaced from said first end, which second local extremum has a curvature opposite to a curvature of the first local extremum, such that if the second local extremum is a minimum, the first local extremum is a maximum, and vice versa.

* * * * *